US012471281B2

(12) United States Patent
Greenlee et al.

(10) Patent No.: US 12,471,281 B2
(45) Date of Patent: Nov. 11, 2025

(54) METHODS USED IN FORMING MEMORY ARRAYS HAVING STRINGS OF MEMORY CELLS

(71) Applicant: Micron Technology, Inc., Boise, ID (US)

(72) Inventors: Jordan D. Greenlee, Boise, ID (US); Jiewei Chen, Meridian, ID (US); John D. Hopkins, Meridian, ID (US); Everett A. McTeer, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 630 days.

(21) Appl. No.: 17/869,586

(22) Filed: Jul. 20, 2022

(65) Prior Publication Data

US 2023/0389313 A1   Nov. 30, 2023

Related U.S. Application Data

(60) Provisional application No. 63/347,423, filed on May 31, 2022.

(51) Int. Cl.
*H10B 43/27* (2023.01)
*H10B 41/27* (2023.01)

(52) U.S. Cl.
CPC ............ *H10B 43/27* (2023.02); *H10B 41/27* (2023.02)

(58) Field of Classification Search
CPC ........ H10B 43/27; H10B 41/27; H10B 41/10; H10B 43/10

USPC ......................................................... 257/314
See application file for complete search history.

(56) References Cited

U.S. PATENT DOCUMENTS

| 2009/0224309 A1* | 9/2009 | Kidoh | H10B 43/50 257/326 |
| 2018/0122904 A1* | 5/2018 | Matsumoto | H10B 43/10 |

FOREIGN PATENT DOCUMENTS

| CN | 104217953 B | * | 6/2017 | ........... H10D 64/015 |
| CN | 110428859 A | * | 11/2019 | |
| CN | 111554691 A | * | 8/2020 | ....... H01L 23/53257 |

* cited by examiner

*Primary Examiner* — Mohammad M Hoque
(74) *Attorney, Agent, or Firm* — Wells St. John P.S.

(57) ABSTRACT

A memory array comprising strings of memory cells comprises laterally-spaced memory blocks individually comprising a first vertical stack comprising vertically-alternating insulative tiers and conductive tiers. Strings of memory cells comprise channel-material strings that extend through the insulative tiers and the conductive tiers. A second vertical stack is aside the first vertical stack. The second vertical stack comprises insulative tiers collectively comprising at least two different compositions relative individual of the insulative tiers. Individual of the at least two different compositions comprise silicon nitride. One of the individual different compositions comprise carbon-doped silicon nitride having at least 0.5 atomic percent more carbon than atomic percent of carbon, if any, in the silicon nitride of another of the individual different compositions. Other embodiments, including method, are disclosed.

30 Claims, 16 Drawing Sheets

METHODS USED IN FORMING MEMORY ARRAYS HAVING STRINGS OF MEMORY CELLS

RELATED PATENT DATA

This application claims priority to U.S. Provisional Patent Application Ser. No. 63/347,423, filed May 31, 2022, entitled "Memory Circuitry And Method Used In Forming Memory Circuitry", naming Jordan D. Greenlee, Jiewei Chen, John D. Hopkins, and Everett A. McTeer as inventors, the disclosure of which is incorporated by reference.

TECHNICAL FIELD

Embodiments disclosed herein pertain to memory circuitry and to methods used in forming memory circuitry.

BACKGROUND

Memory is one type of integrated circuitry and is used in computer systems for storing data. Memory may be fabricated in one or more arrays of individual memory cells. Memory cells may be written to, or read from, using digitlines (which may also be referred to as bitlines, data lines, or sense lines) and access lines (which may also be referred to as wordlines). The sense lines may conductively interconnect memory cells along columns of the array, and the access lines may conductively interconnect memory cells along rows of the array. Each memory cell may be uniquely addressed through the combination of a sense line and an access line.

Memory cells may be volatile, semi-volatile, or non-volatile. Non-volatile memory cells can store data for extended periods of time in the absence of power. Non-volatile memory is conventionally specified to be memory having a retention time of at least about 10 years. Volatile memory dissipates and is therefore refreshed/rewritten to maintain data storage. Volatile memory may have a retention time of milliseconds or less. Regardless, memory cells are configured to retain or store memory in at least two different selectable states. In a binary system, the states are considered as either a "0" or a "1". In other systems, at least some individual memory cells may be configured to store more than two levels or states of information.

A field effect transistor is one type of electronic component that may be used in a memory cell. These transistors comprise a pair of conductive source/drain regions having a semiconductive channel region there-between. A conductive gate is adjacent the channel region and separated there-from by a thin gate insulator. Application of a suitable voltage to the gate allows current to flow from one of the source/drain regions to the other through the channel region. When the voltage is removed from the gate, current is largely prevented from flowing through the channel region. Field effect transistors may also include additional structure, for example a reversibly programmable charge-storage region as part of the gate construction between the gate insulator and the conductive gate.

Flash memory is one type of memory and has numerous uses in modern computers and devices. For instance, modern personal computers may have BIOS stored on a flash memory chip. As another example, it is becoming increasingly common for computers and other devices to utilize flash memory in solid state drives to replace conventional hard drives. As yet another example, flash memory is popular in wireless electronic devices because it enables manufacturers to support new communication protocols as they become standardized, and to provide the ability to remotely upgrade the devices for enhanced features.

NAND may be a basic architecture of integrated flash memory. A NAND cell unit comprises at least one selecting device coupled in series to a serial combination of memory cells (with the serial combination commonly being referred to as a NAND string). NAND architecture may be configured in a three-dimensional arrangement comprising vertically-stacked memory cells individually comprising a reversibly programmable vertical transistor. Control or other circuitry may be formed below the vertically-stacked memory cells. Other volatile or non-volatile memory array architectures may also comprise vertically-stacked memory cells that individually comprise a transistor.

Memory arrays may be arranged in memory pages, memory blocks and partial blocks (e.g., sub-blocks), and memory planes, for example as shown and described in any of U.S. Patent Application Publication Nos. 2015/0228651, 2016/0267984, and 2017/0140833. The memory blocks may at least in part define longitudinal outlines of individual wordlines in individual wordline tiers of vertically-stacked memory cells. Connections to these wordlines may occur in a so-called "stair-step structure" at an end or edge of an array of the vertically-stacked memory cells. The stair-step structure includes individual "stairs" (alternately termed "steps" or "stair-steps") that define contact regions of the individual wordlines upon which elevationally-extending conductive vias contact to provide electrical access to the wordlines.

DETAILED DESCRIPTION OF EXAMPLE EMBODIMENTS

Figure 1:
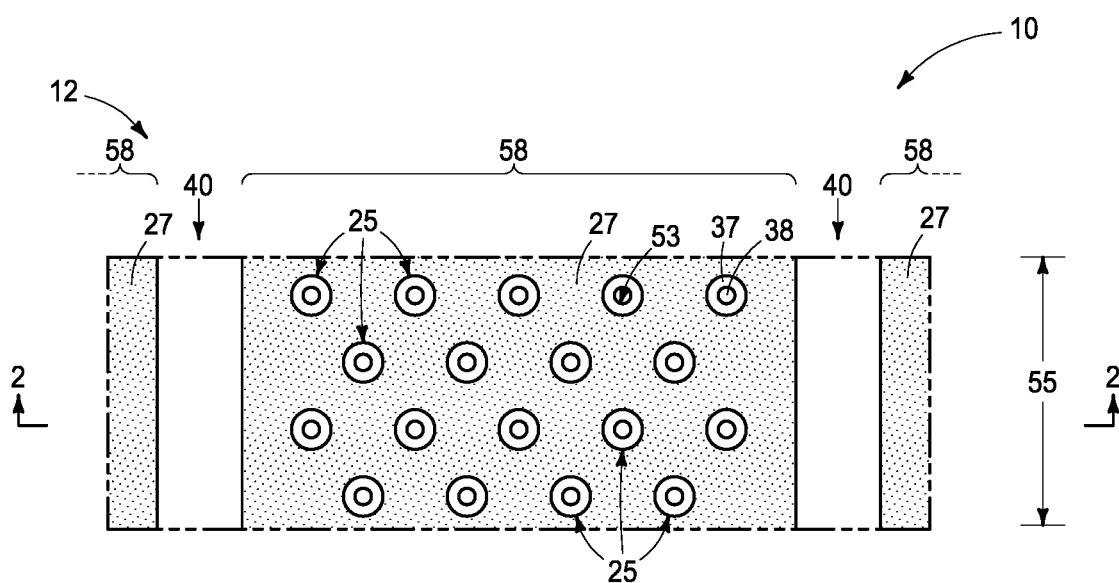
FIGS. 1-5 are diagrammatic cross-sectional views of portions of a construction that will comprise an array of elevationally-extending strings of memory cells in accordance with an embodiment of the invention.
Figure 2:
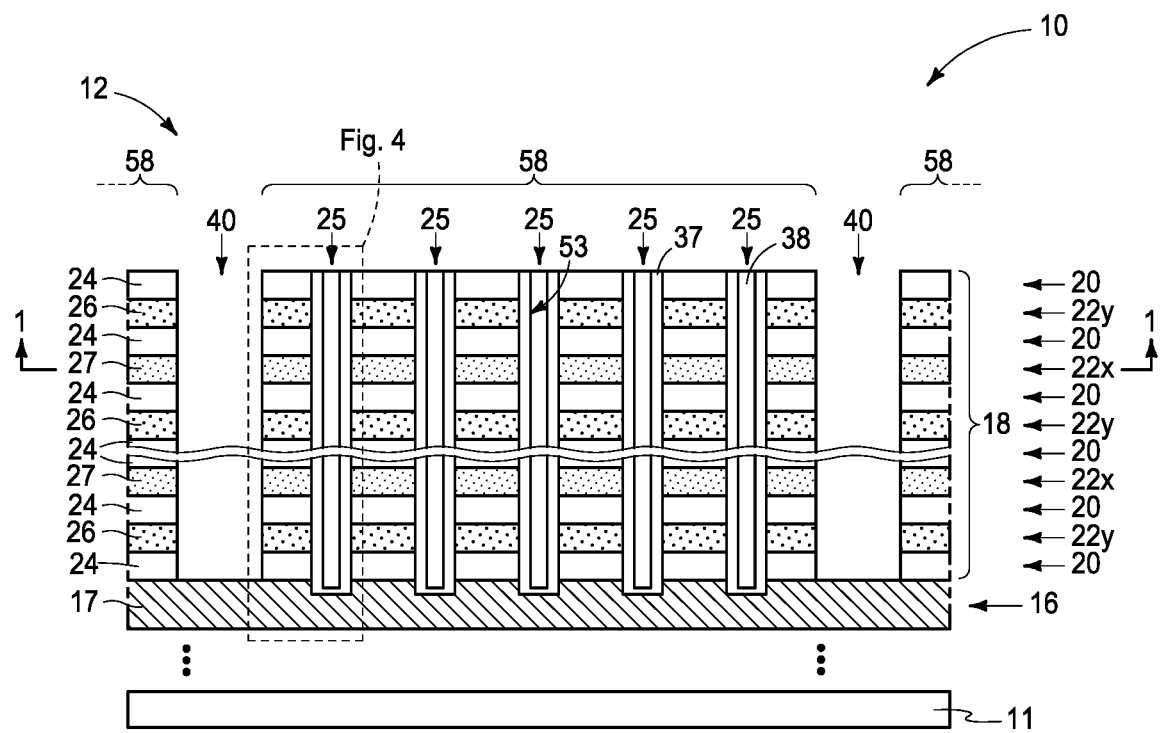
Figure 3:
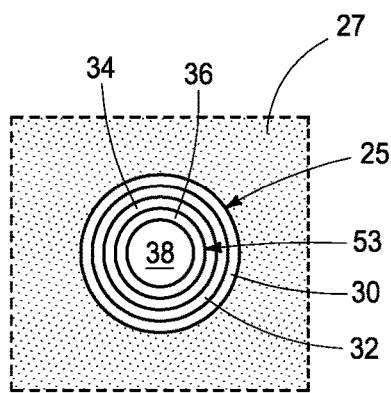

Embodiments of the invention encompass methods used in forming a memory array, for example an array of NAND or other memory cells that may have at least some peripheral control circuitry under the array (e.g., CMOS-under-array). Embodiments of the invention encompass so-called "gate-last" or "replacement-gate" processing, so-called "gate-first" processing, and other processing whether existing or future-developed independent of when transistor gates are formed. Embodiments of the invention also encompass integrated circuitry comprising a memory array comprising strings of memory cells (e.g., NAND architecture) independent of method of manufacture. First example method embodiments are described with reference to FIGS. 1-35.

FIGS. 1-5 show an example construction 10 having an array 12 in which elevationally-extending strings of transistors and/or memory cells will be formed. Such includes a base substrate 11 having any one or more of conductive/conductor/conducting, semiconductive/semiconductor/semiconducting, or insulative/insulator/insulating (i.e., electrically herein) materials. Various materials have been formed elevationally over base substrate 11. Materials may be aside, elevationally inward, or elevationally outward of the FIGS. 1-5-depicted materials. For example, other partially or wholly fabricated components of integrated circuitry may be provided somewhere above, about, or within base substrate 11. Control and/or other peripheral circuitry for operating components within an array (e.g., array 12) of elevationally-extending strings of memory cells may also be fabricated and may or may not be wholly or partially within an array or sub-array. Further, multiple sub-arrays may also be fabricated and operated independently, in tandem, or otherwise relative one another. In this document, a "sub-array" may also be considered as an array.

A conductor tier 16 comprising conductor material 17 (e.g., conductively-doped polysilicon atop $WSi_x$) is above substrate 11. Conductor tier 16 may comprise part of control circuitry (e.g., peripheral-under-array circuitry and/or a common source line or plate) used to control read and write access to the transistors and/or memory cells in array 12. A vertical stack 18 comprising vertically-alternating insulative tiers 20 and conductive tiers 22* is directly above conductor tier 16 (an * being used as a suffix to be inclusive of all such same-numerically-designated structures that may or may not have other suffixes). In some embodiments, conductive tiers 22* may be referred to as first tiers 22* and insulative tiers 20 may be referred to as second tiers 20. Example thickness for each of tiers 20 and 22* is 20 to 60 nanometers. The example uppermost tier 20 may be thicker/thickest compared to one or more other tiers 20 and/or 22*. Only a small number of tiers 20 and 22* is shown in FIGS. 1-5, with more likely stack 18 comprising dozens, a hundred or more, etc. of tiers 20 and 22*. Other circuitry that may or may not be part of peripheral and/or control circuitry may be between conductor tier 16 and stack 18. For example, multiple vertically-alternating tiers of conductive material and insulative material of such circuitry may be below a lowest of the conductive tiers 22* and/or above an uppermost of the conductive tiers 22*. For example, one or more select gate tiers (not shown) may be between conductor tier 16 and the lowest conductive tier 22* and one or more select gate tiers may be above an uppermost of conductive tiers 22* (not shown). Alternately or additionally, at least one of the depicted uppermost and lowest conductive tiers 22* may be a select gate tier.

Channel openings 25 have been formed (e.g., by etching) through insulative tiers 20 and conductive tiers 22* to conductor tier 16. Channel openings 25 may taper radially-inward and/or radially-outward (not shown) moving deeper in stack 18. In some embodiments, channel openings 25 may go into conductor material 17 of conductor tier 16 as shown or may stop there-atop (not shown). Alternately, as an example, channel openings 25 may stop atop or within the lowest insulative tier 20. A reason for extending channel openings 25 at least to conductor material 17 of conductor tier 16 is to assure direct electrical coupling of channel material to conductor tier 16 without using alternative processing and structure to do so when such a connection is desired and/or to provide an anchoring effect to material that is within channel openings 25. Etch-stop material (not shown) may be within or atop conductor material 17 of conductor tier 16 to facilitate stopping of the etching of channel openings 25 relative to conductor tier 16 when such is desired. Such etch-stop material may be sacrificial or non-sacrificial. By way of example and for brevity only, channel openings 25 are shown as being arranged in groups or columns of staggered rows of four and five openings 25 per row and being arrayed in laterally-spaced memory block regions 58 that will comprise laterally-spaced memory blocks 58 in a finished circuitry construction. In this document, "block" is generic to include "sub-block". Memory block regions 58 and resultant memory blocks 58 (not yet shown) may be considered as being longitudinally elongated and oriented, for example along a first direction 55. Any alternate existing or future-developed arrangement and construction may be used.

Example memory block regions 58 are shown as at least in part having been defined by horizontally-elongated trenches 40 that were formed (e.g., by anisotropic etching) into stack 18 (e.g., trenches 40 being between immediately-laterally-adjacent memory block regions 58). Trenches 40 will typically be wider than channel openings 25 (e.g., 3 to 10 times wider). Trenches 40 may have respective bottoms that are directly against conductor material 17 (e.g., atop or within) of conductor tier 16 (as shown) or may have respective bottoms that are above conductor material 17 of conductor tier 16 (not shown). Trenches 40 may taper laterally inward and/or outward in vertical cross-section (not shown).

Transistor channel material may be formed in the individual channel openings elevationally along the insulative tiers and the conductive tiers, thus comprising individual channel-material strings, which is directly electrically coupled with conductive material in the conductor tier. Individual memory cells of the example memory array being formed may comprise a gate region (e.g., a control-gate region) and a memory structure laterally between the gate region and the channel material. In one such embodiment, the memory structure is formed to comprise a charge-blocking region, storage material (e.g., charge-storage material), and an insulative charge-passage material. The storage material (e.g., floating gate material such as doped or undoped silicon or charge-trapping material such as silicon nitride, metal dots, etc.) of the individual memory cells is elevationally along individual of the charge-blocking regions. The insulative charge-passage material (e.g., a band gap-engineered structure having nitrogen-containing material [e.g., silicon nitride] sandwiched between two insulator oxides [e.g., silicon dioxide]) is laterally between the channel material and the storage material.

The figures show one embodiment wherein charge-blocking material 30, storage material 32, and charge-passage material 34 have been formed in individual channel openings 25 elevationally along insulative tiers 20 and conductive tiers 22*. Transistor materials 30, 32, and 34 (e.g., memory-cell materials) may be formed by, for example, deposition of respective thin layers thereof over stack 18 and within individual channel openings 25 followed by planarizing such back at least to a top surface of stack 18 as shown.

Channel material 36 has also been formed in channel openings 25 elevationally along insulative tiers 20 and conductive tiers 22* and comprise individual channel-material strings 53 in one embodiment having memory-cell materials (e.g., 30, 32, and 34) there-along and with material 24 in insulative tiers 20 being horizontally-between immediately-adjacent channel-material strings 53. Materials 30, 32, 34, and 36 are collectively shown as and only designated as material 37 in some figures due to scale. Example channel materials 36 include appropriately-doped crystalline semiconductor material, such as one or more silicon, germanium, and so-called III/V semiconductor materials (e.g., GaAs, InP, GaP, and GaN). Example thickness for each of materials 30, 32, 34, and 36 is 25 to 100 Angstroms. Punch etching may be conducted as shown to remove materials 30, 32, and 34 from the bases of channel openings 25 to expose conductor tier 16 such that channel material 36 (channel-material string 53) is directly electrically coupled with conductor material 17 of conductor tier 16. Such punch etching may occur separately with respect to each of materials 30, 32, and 34 (as shown) or may occur collectively with respect to all after deposition of material 34 (not shown). Alternately, and by way of example only, no punch etching may be conducted and channel material 36 may be directly electrically coupled with conductor material 17 of conductor tier 16 by a separate conductive interconnect (not shown). Channel openings 25 are shown as comprising a radially-central solid dielectric material 38 (e.g., spin-on-dielectric, silicon dioxide, and/or silicon nitride). Alternately, and by way of example only, the radially-central portion within channel openings 25 may include void space(s) (not shown) and/or be devoid of solid material (not shown).

Material of first tiers 22* (e.g., 26 and 27) is of different composition from material of second tiers 20 (e.g., 24; e.g., silicon dioxide), with material (e.g., most, if not all) of first tiers 22* comprising silicon nitride. Most if not all of material of first tiers 22* may be sacrificial. At least one of a lower of first tiers 22* (the at least one being in a bottom half of stack 18; e.g., a tier 22x) comprises carbon-doped silicon nitride 27 having at least 0.5 atomic percent more carbon than atomic percent of carbon, if any, in silicon nitride 26 of at least some of first tiers 22* (e.g., 22y) that are directly above the at least one lower first tier 22x. In some embodiments, carbon-doped silicon nitride 27 in the at least one lower first tier 22x has at least 1.0, 2.0, 5.0, and/or 9.0 atomic percent more carbon than atomic percent of carbon, if any, in silicon nitride 26 of the at least some first tiers 22y. In one embodiment, carbon-doped silicon nitride 27 in the at least one lower first tier 22x has at least 2.0 atomic percent carbon. In one embodiment, silicon nitride 26 in the at least some tiers 22y is devoid of carbon (i.e., from 0 atoms/cm$^3$ to $1 \times 10^{12}$ atoms/cm$^3$). In one embodiment, material 24 in individual of second tiers 20 at least predominantly comprises silicon dioxide and, regardless, in one embodiment material 24 is at least predominantly devoid of silicon nitride (i.e., from 0 molecules/cm$^3$ to $1 \times 10^{12}$ molecules/cm$^3$).

The at least one lower first tier 22x comprising carbon-doped silicon nitride 27 may be only one such tier (not shown) or may be more than one such tier (as shown). Regardless, in one embodiment, the at least one lower first tier 22x comprising carbon-doped silicon nitride 27 is in the lowest first tier 22* in alternating first tiers 22* and second tiers 20 that are directly above conductor tier 16 (not shown). In another embodiment and as shown, the at least one lower first tier 22x comprising carbon-doped silicon nitride 27 is the second-lowest first tier 22* in alternating first tiers 22* and second tiers 20 that are directly above conductor tier 16 (not shown). When the at least one lower first tier 22x comprising carbon-doped silicon nitride 27 is more than one such tier, such more than one in one embodiment are of the same carbon content relative one another and in another embodiment are of at least two different carbon contents relative one another (e.g., the more than one being of more than two different carbon contents relative one another; e.g., reducing in carbon content moving higher in stack 18). In the example embodiment, every other conductive tier 22* is shown as comprising carbon-doped silicon nitride 27 throughout stack 18. Such may be desired to achieve uniformity in processing as respects entire stack 18. Alternately, and by way of examples only, only every second, third, etc. conductive tier may be material 27 or material 26 (not shown). Further alternately, material 27 may only be in a lower half of stack 18 (not shown).

Figure 5:
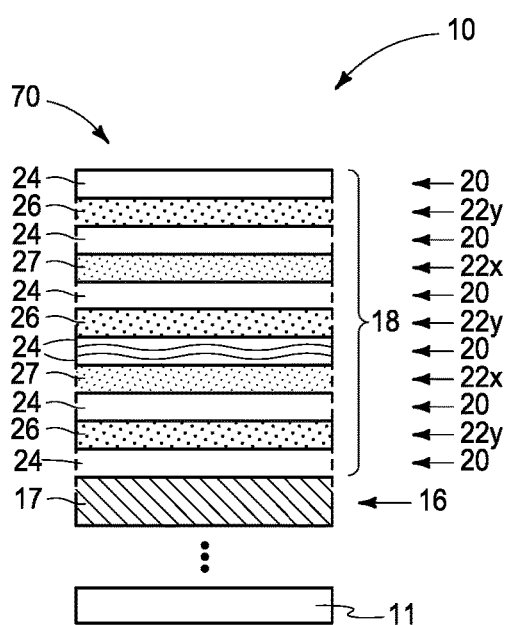
Figure 4:
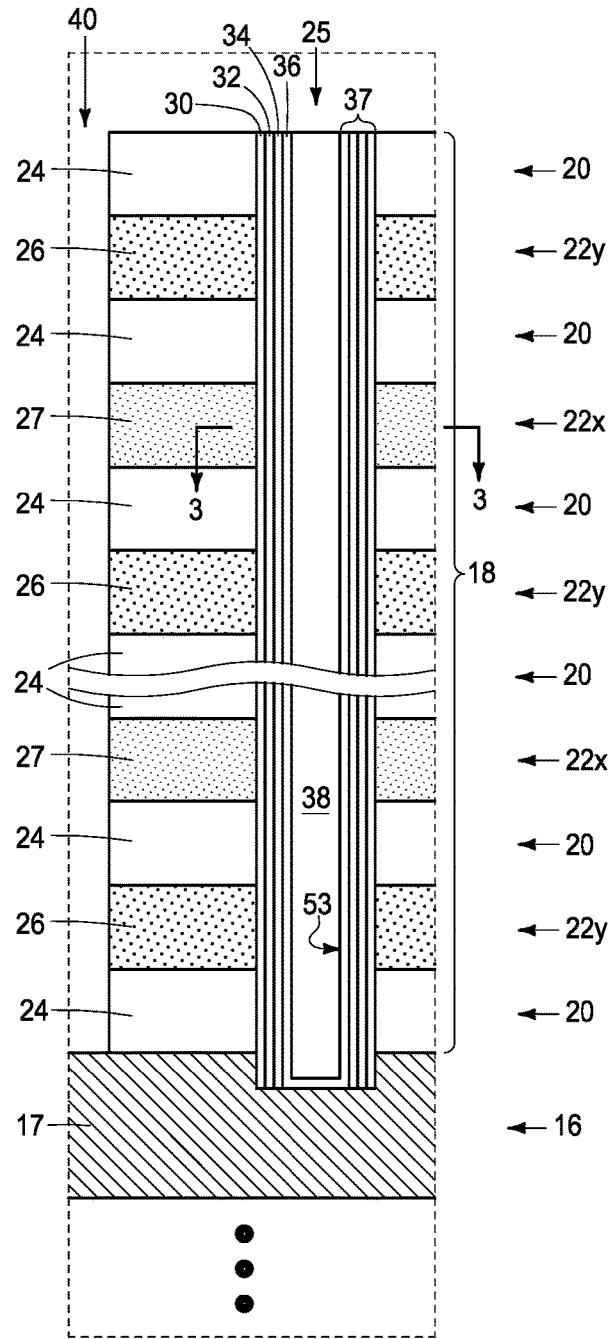
Figure 6:
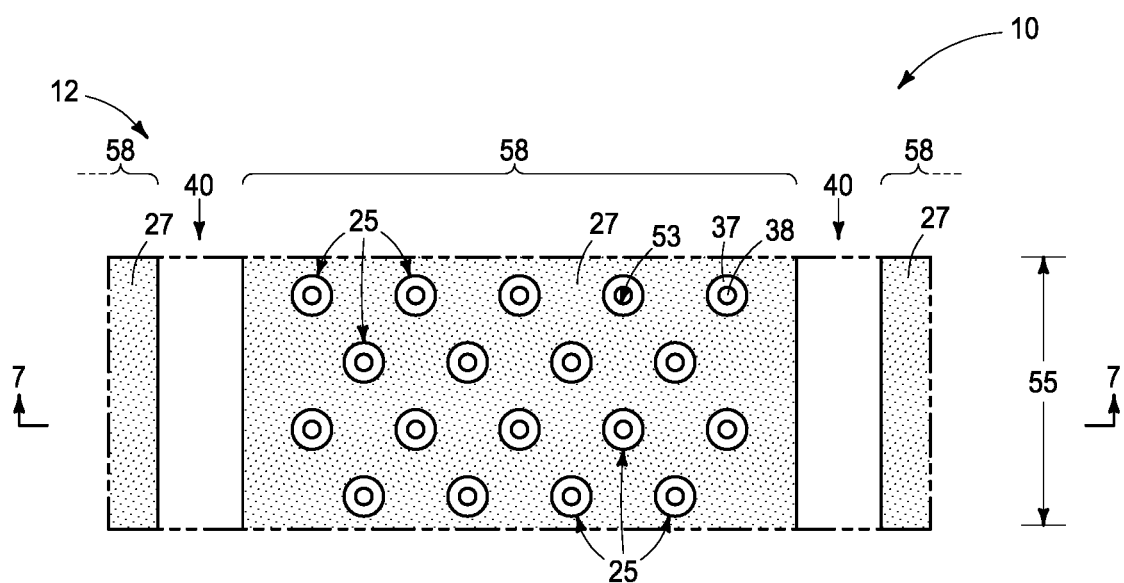
FIGS. 6-35 are diagrammatic sequential sectional and/or enlarged views of the construction of FIGS. 1-5, or portions thereof or alternate and/or additional embodiments, in process in accordance with some embodiments of the invention.
Figure 7:
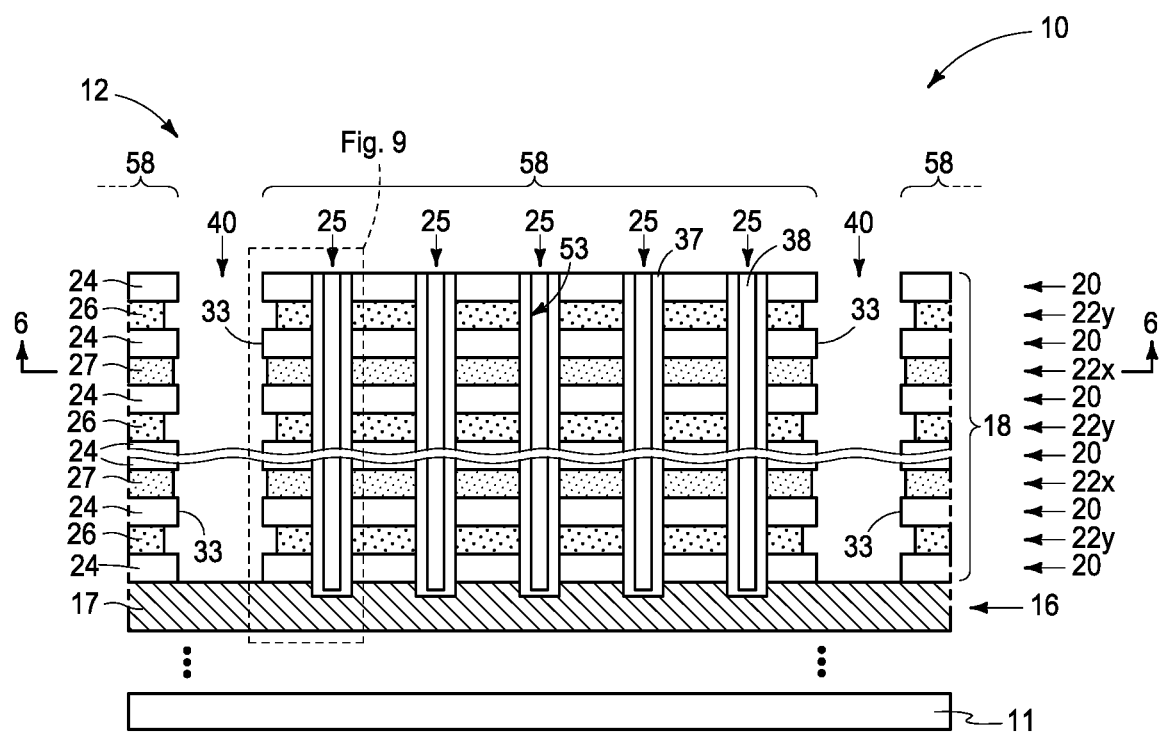
Figures 8, 9:
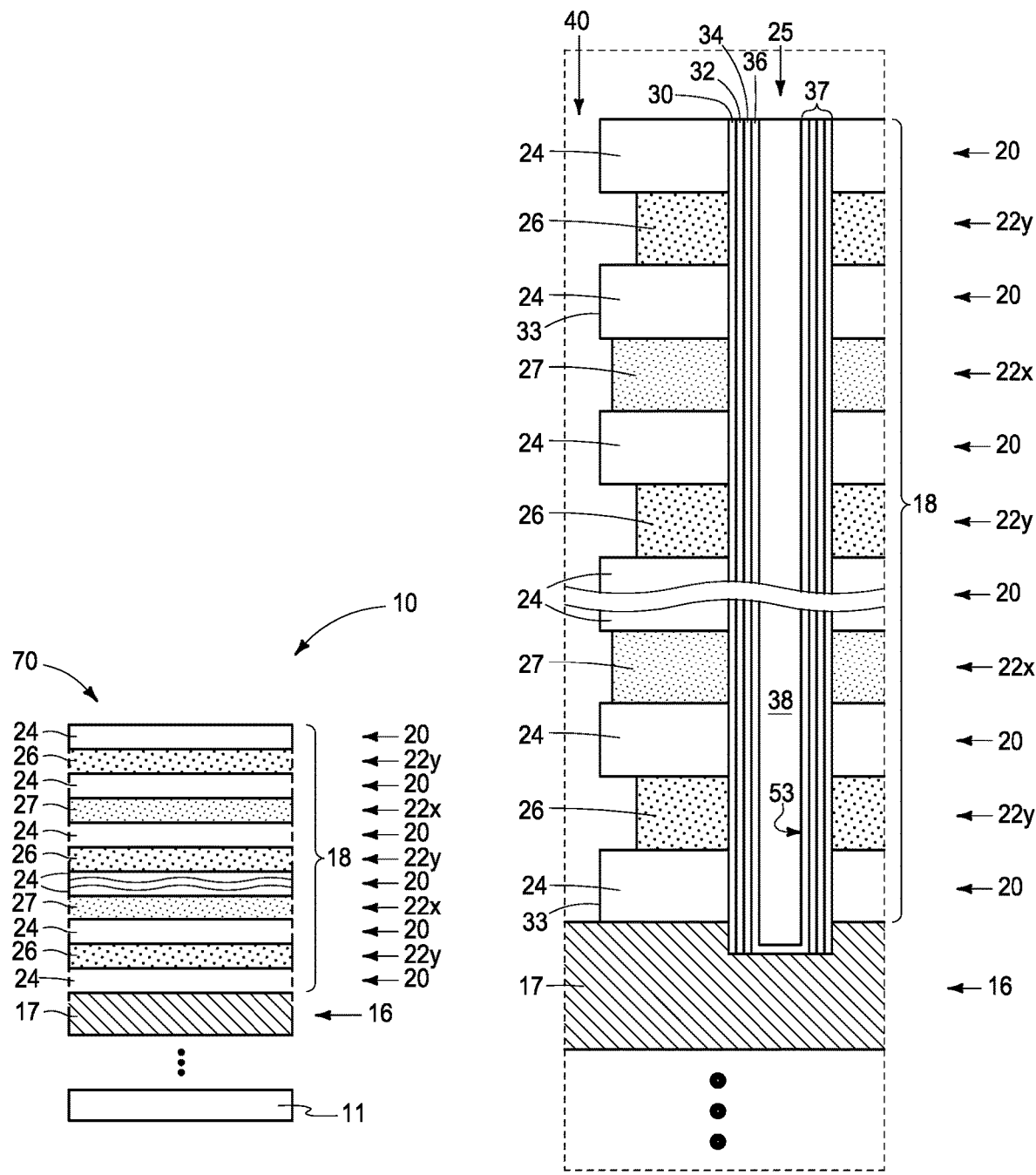
Figure 10:
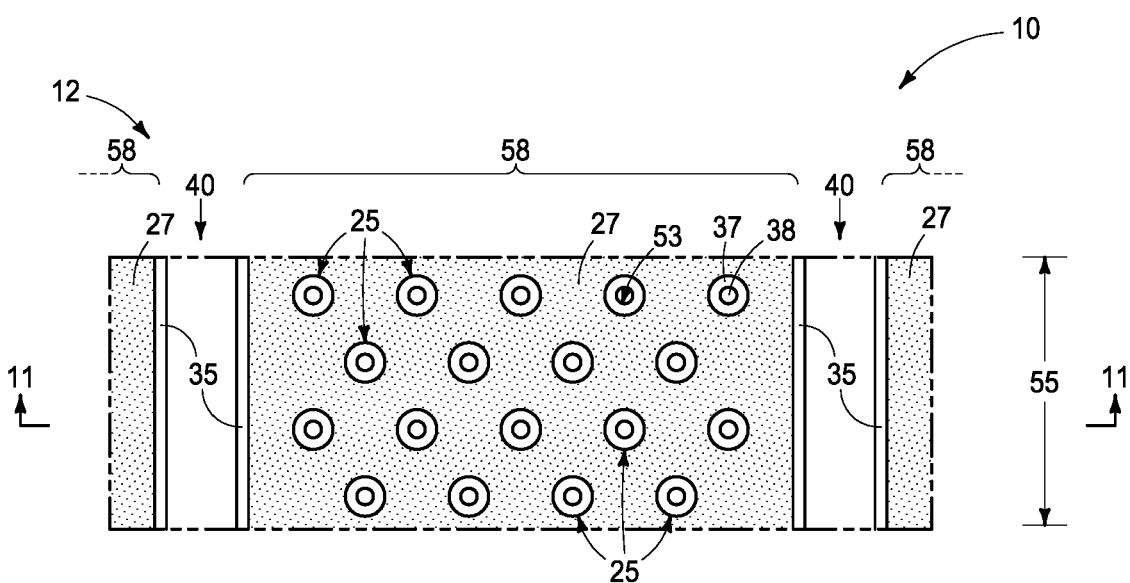
Figure 11:
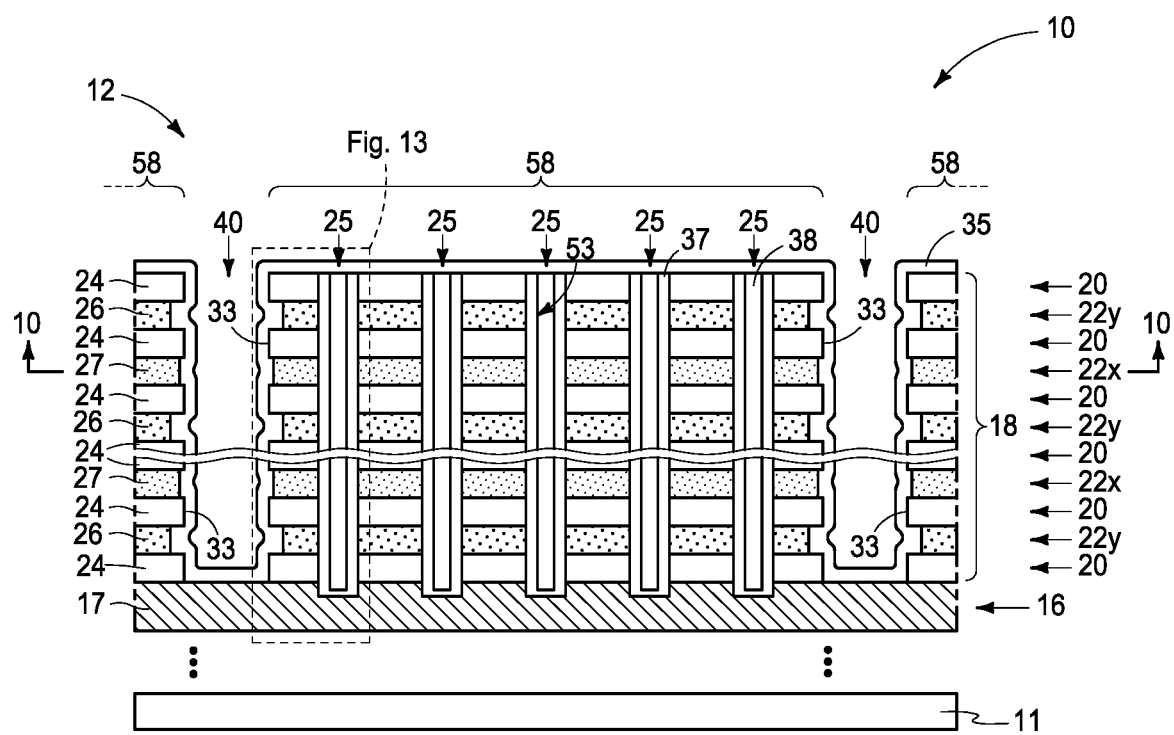
Figure 12:
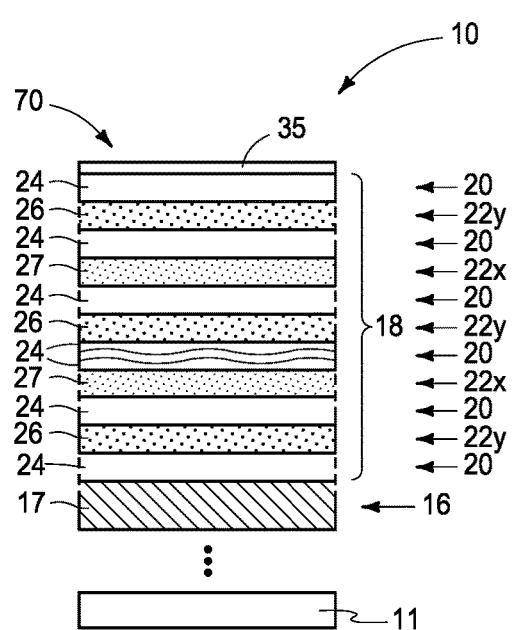
Figure 13:
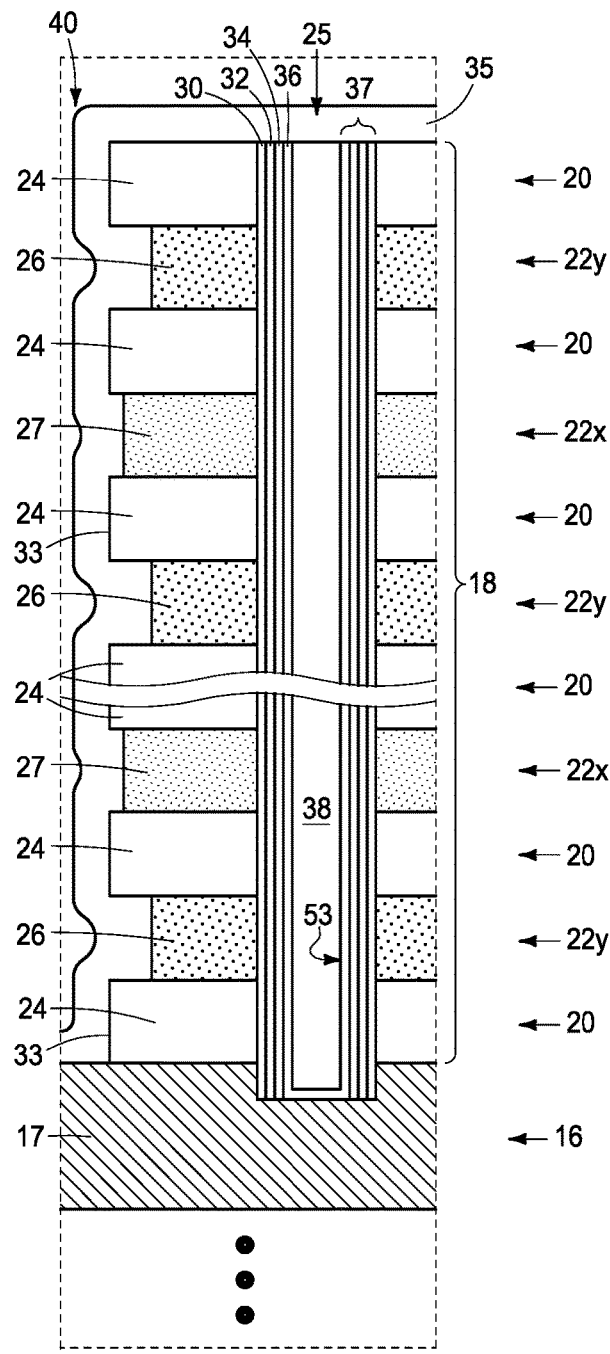
Figure 14:
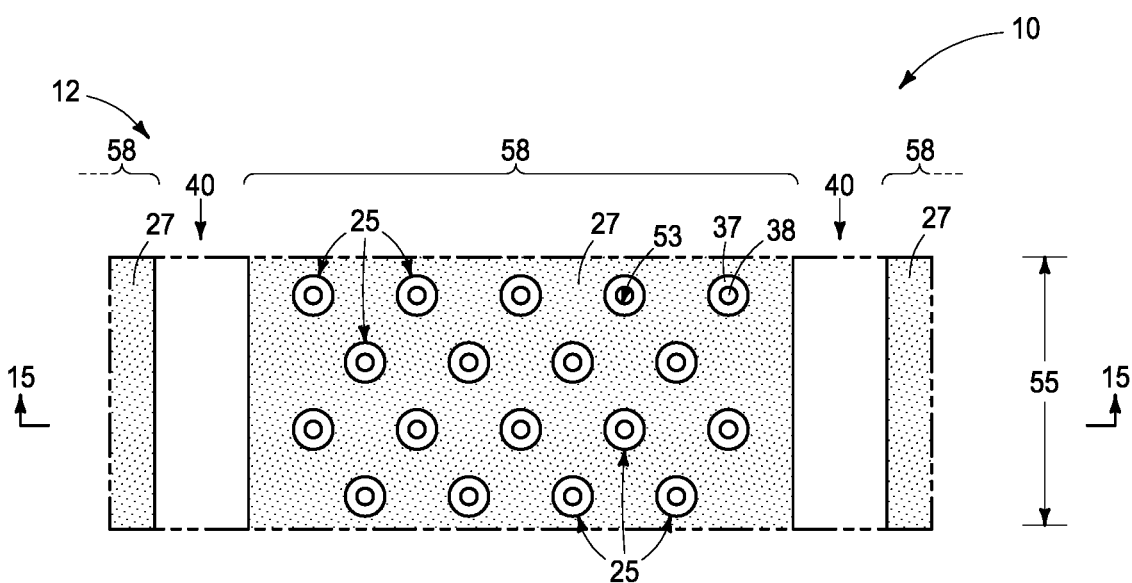
Figure 15:
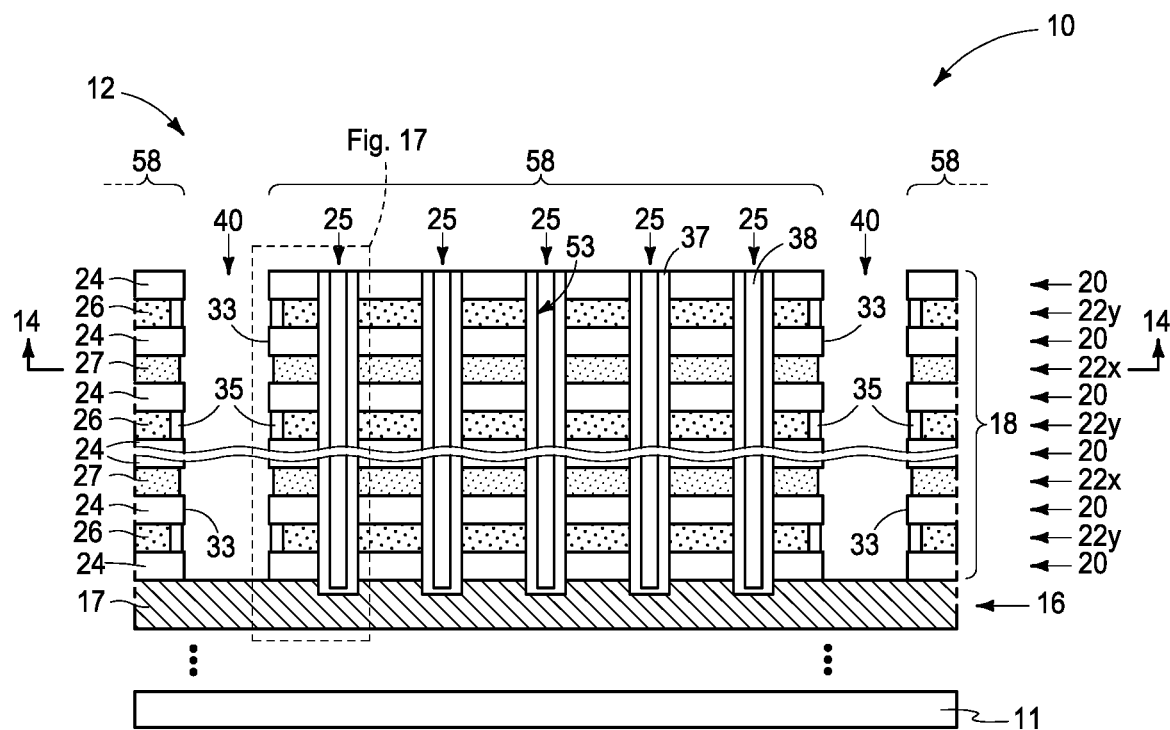
Figure 16:
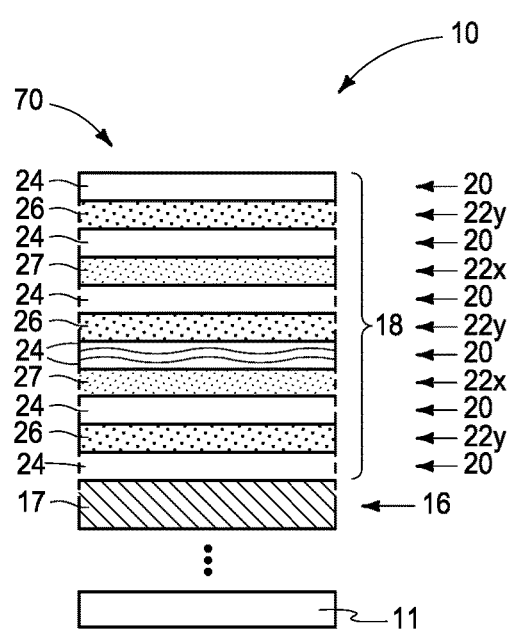
Figure 17:
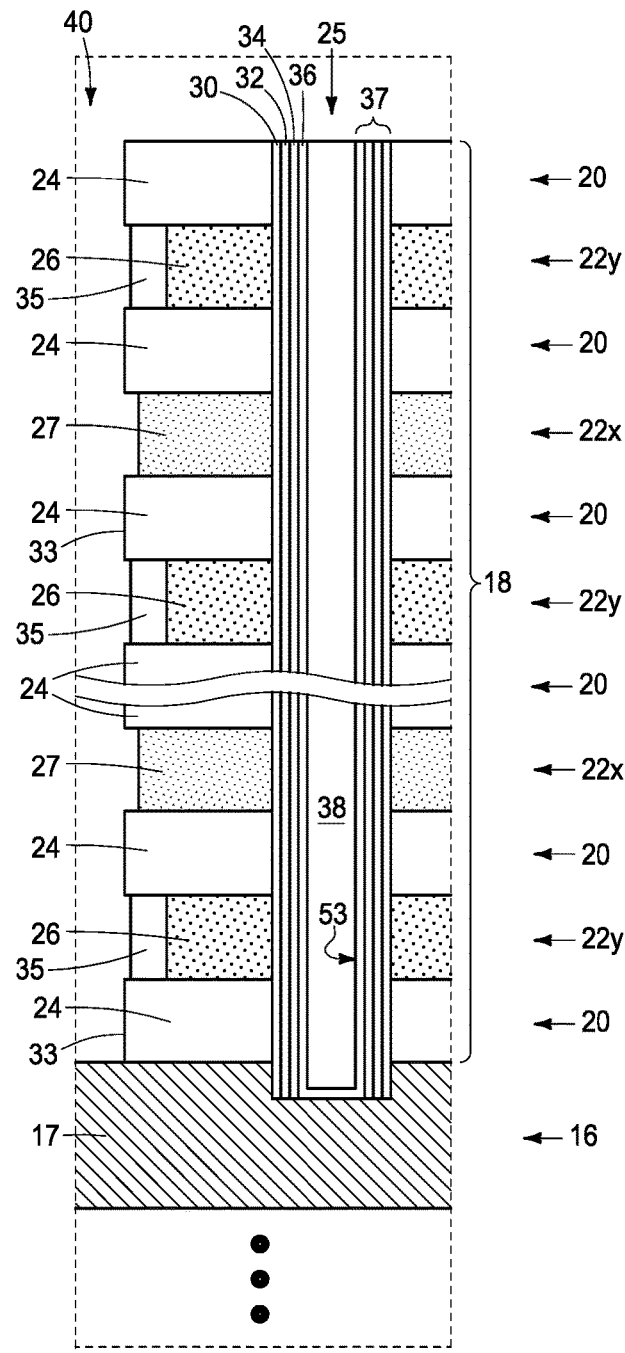
Figure 18:
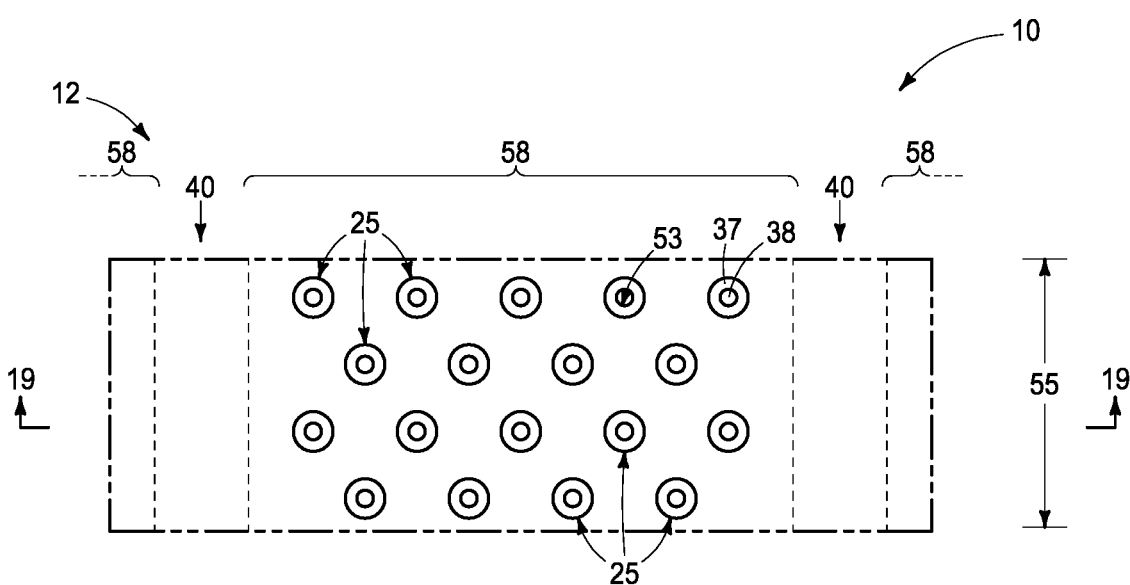
Figure 19:
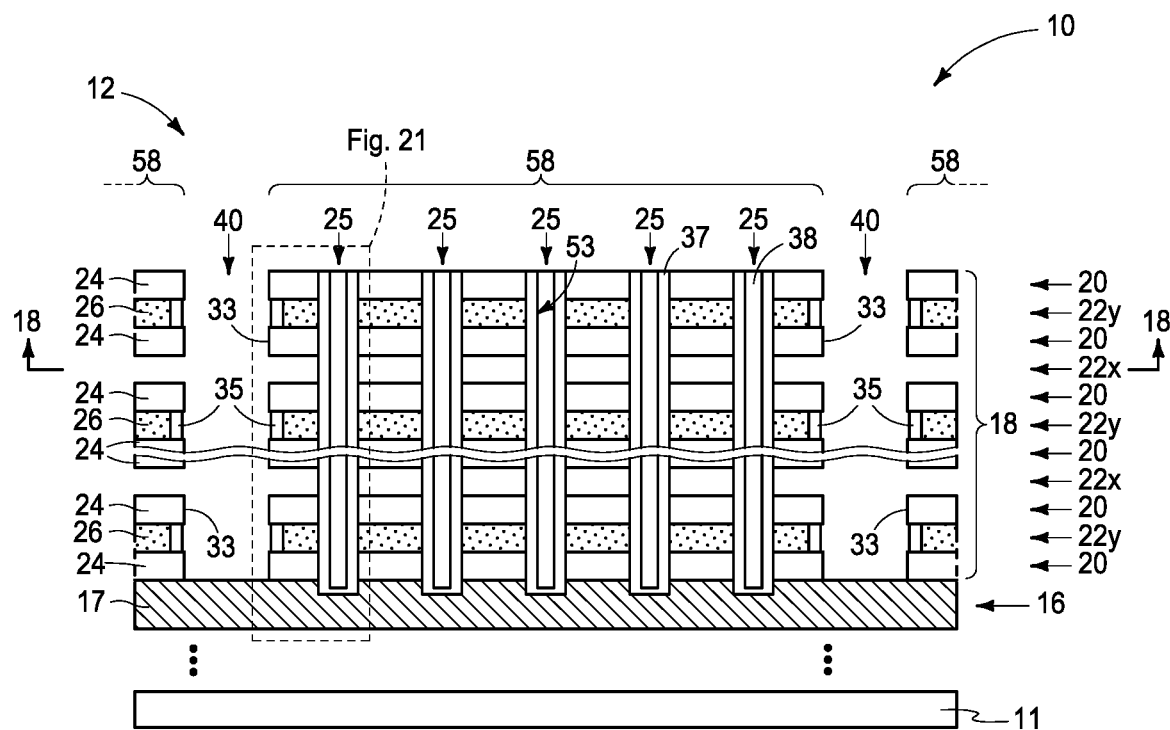
Figure 20:
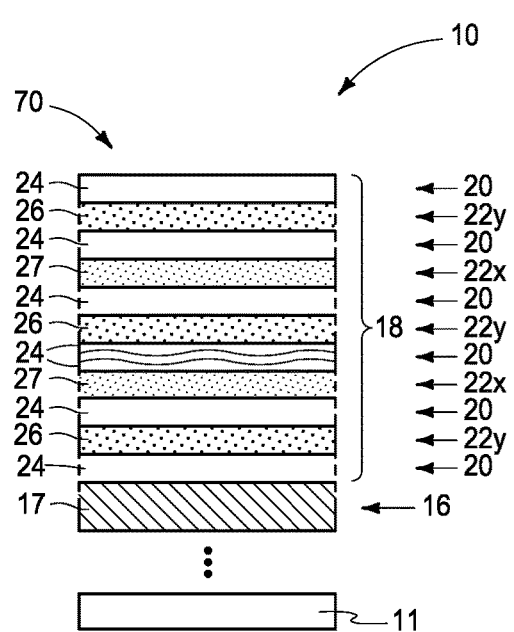
Figure 21:
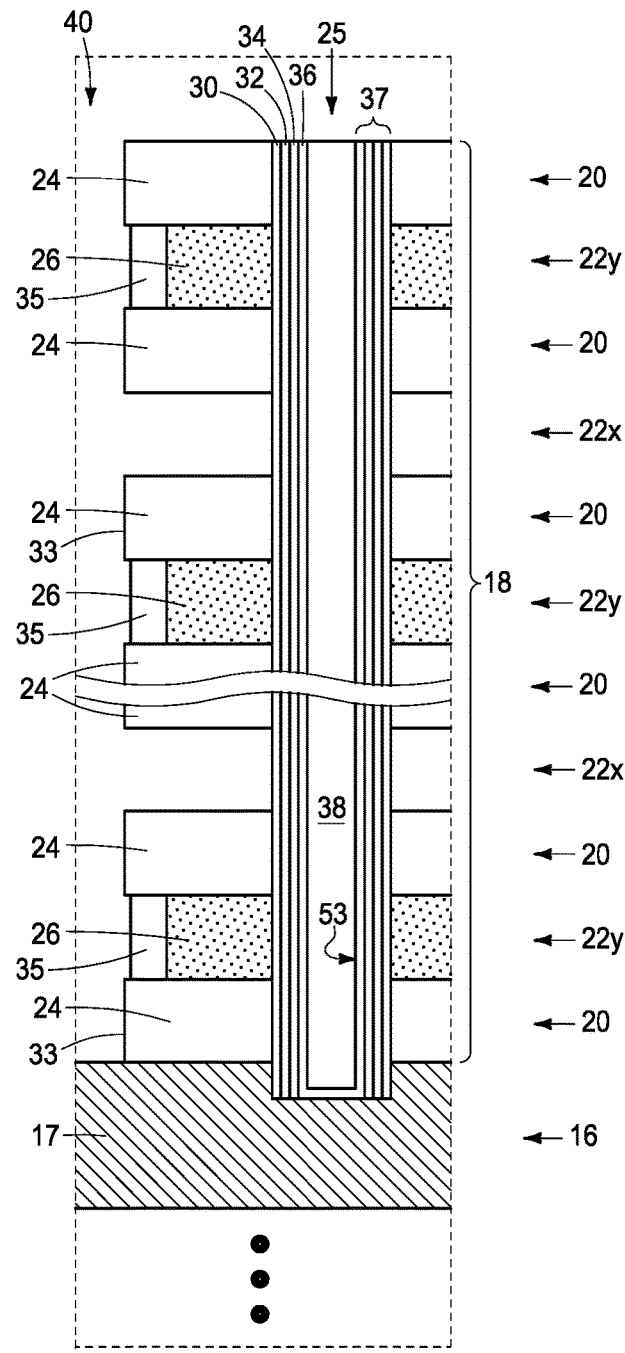
Figure 22:
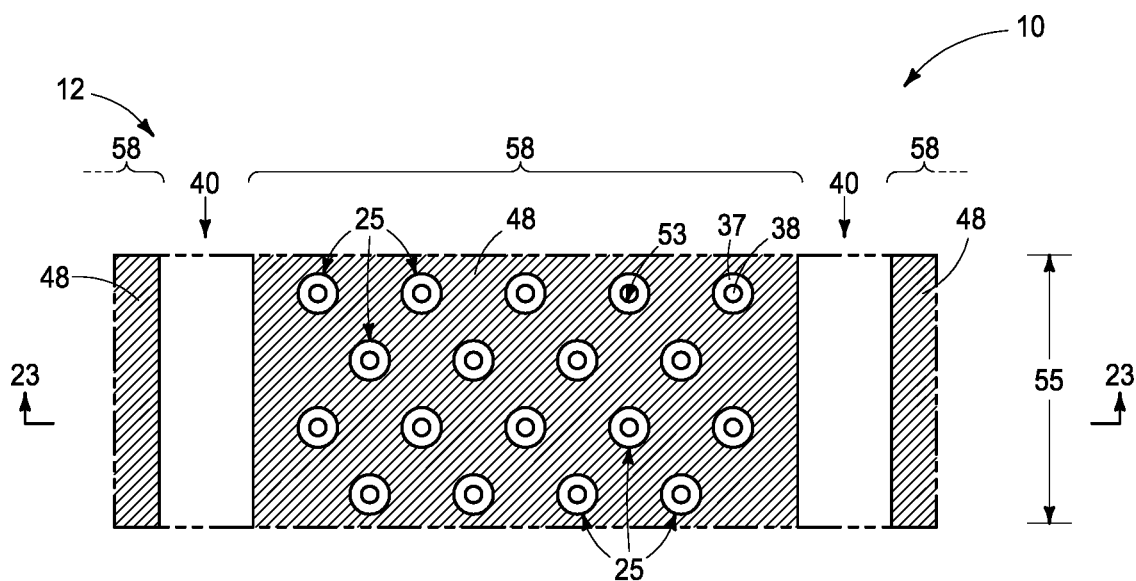
Figure 23:
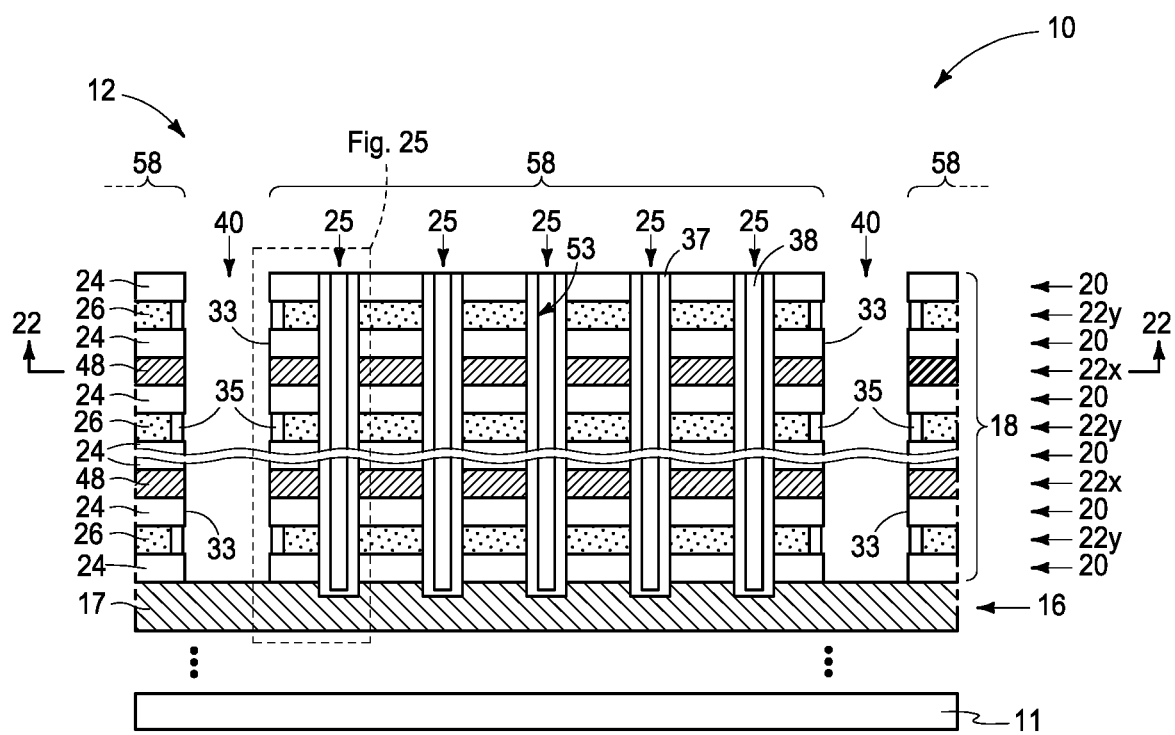
Figure 24:
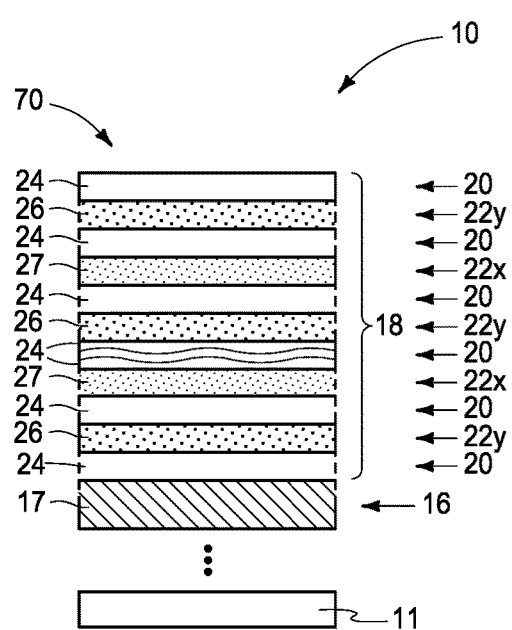
Figure 25:
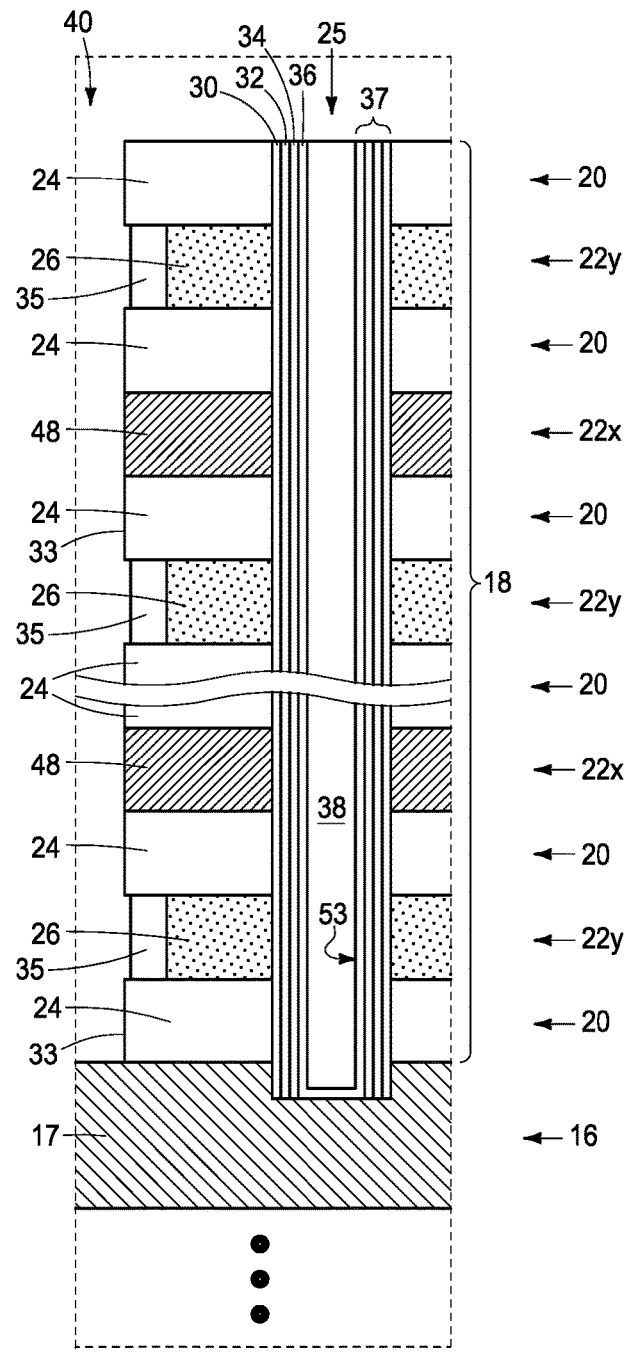
Figure 26:
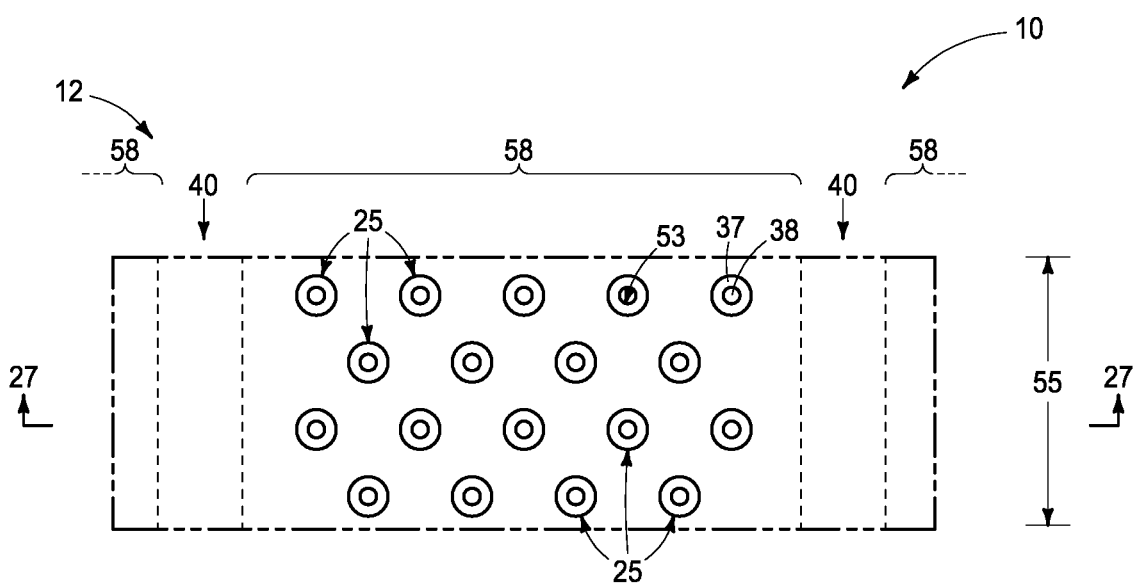
Figure 27:
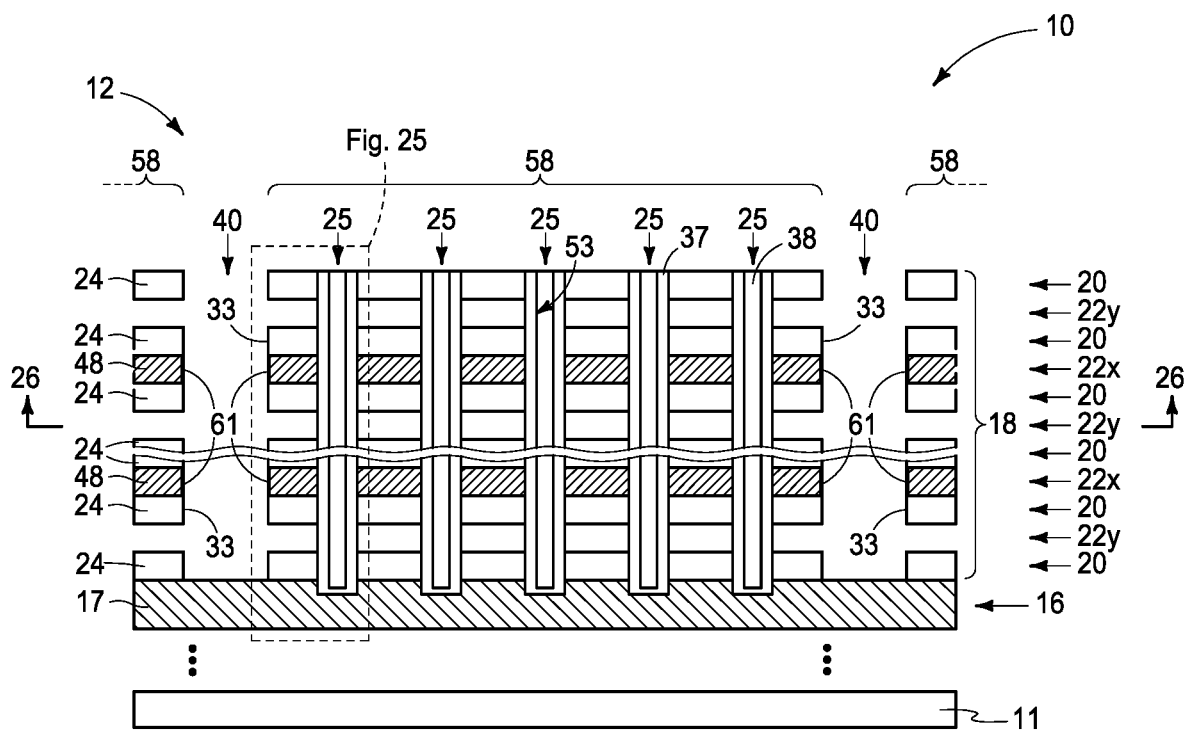
Figure 28:
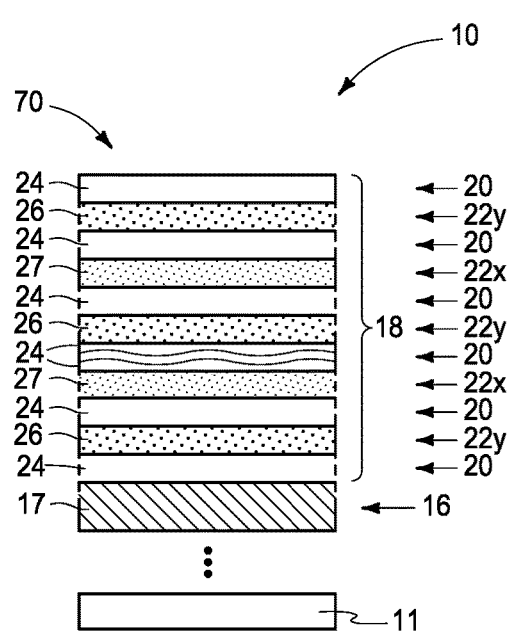
Figure 29:
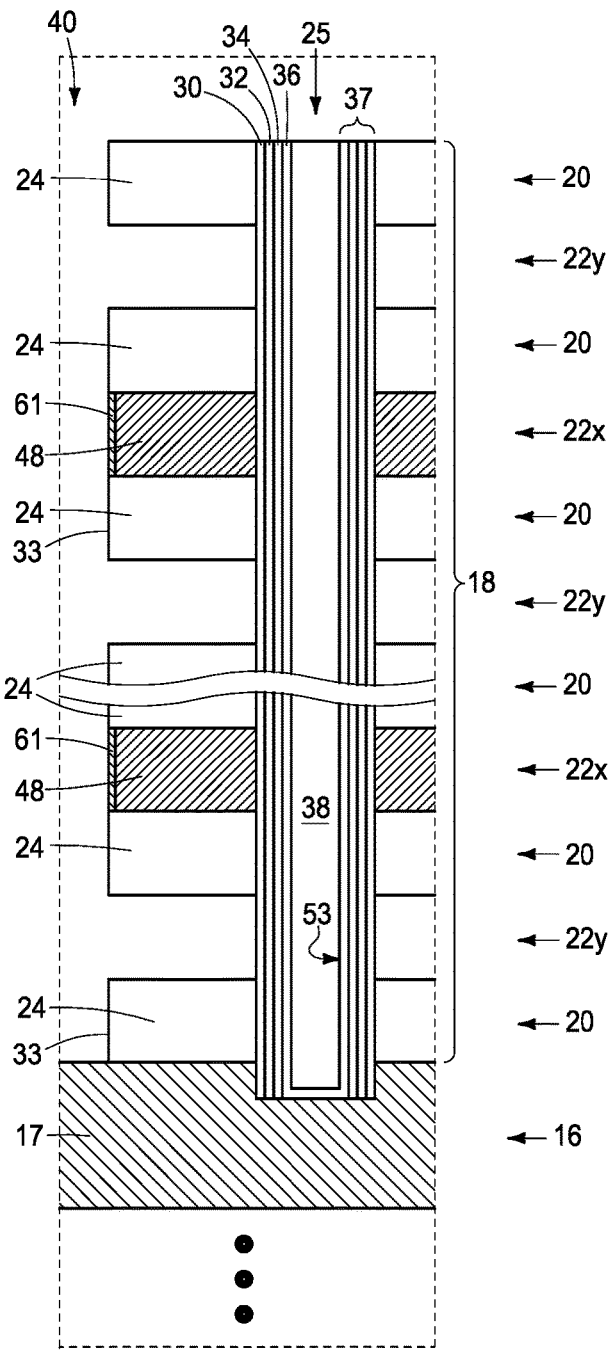
Figure 30:
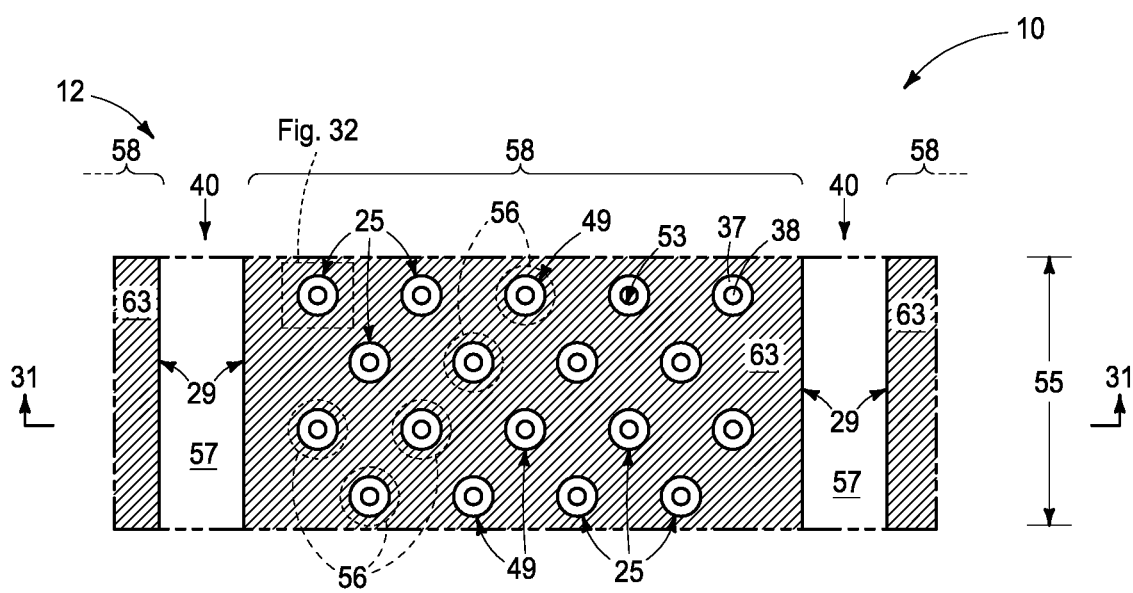
Figure 31:
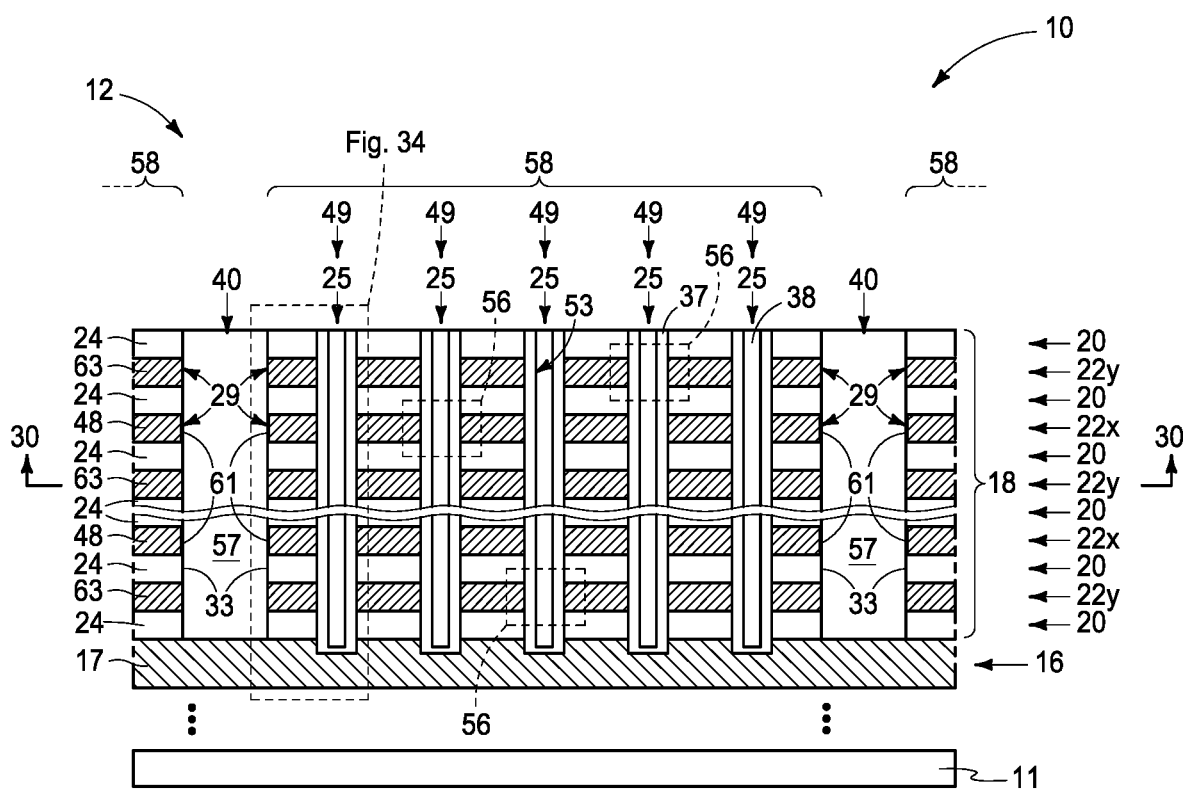
Figure 32:
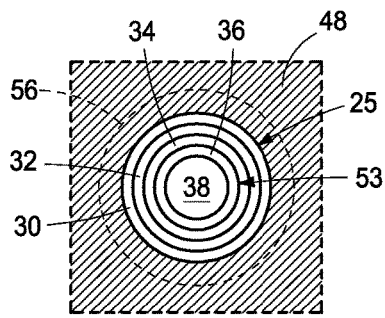
Figure 33:
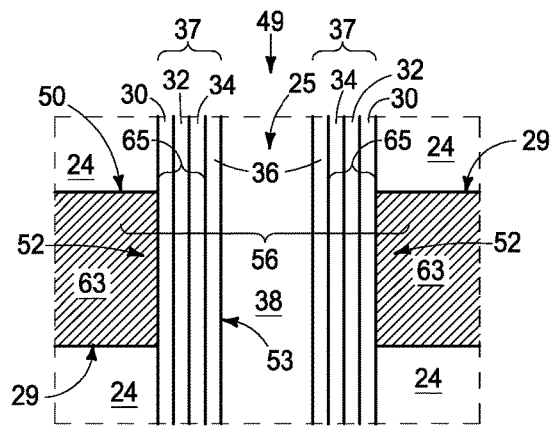
Figure 35:
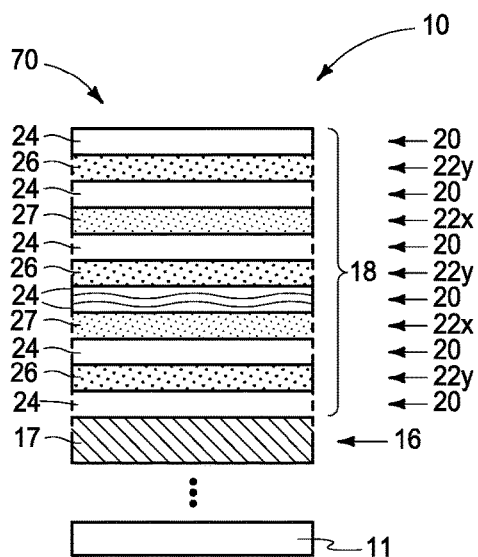
Figure 34:
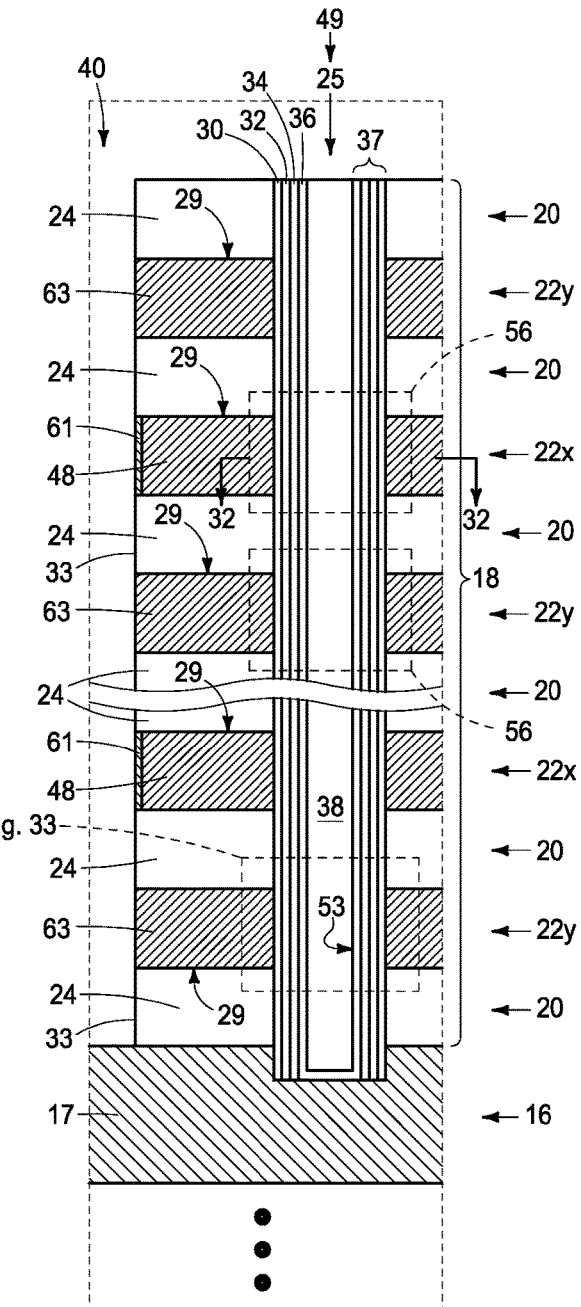

In some embodiments, construction 10 may be considered as comprising a first region (e.g., as shown by FIGS. 1-4) and a second region 70 aside the first region (e.g., as shown in FIG. 5). Second region 70 may be laterally-contacting the first region (not shown) or may be laterally-spaced from the first region (e.g., closely laterally there-adjacent but not touching, or laterally-far there-from and not touching). Second region 70 may be within one or more of the memory-block regions (not shown). In some embodiments, construction 10 may be considered as comprising a first vertical stack (e.g., stack 18 in FIG. 2) and a second vertical stack (e.g., stack 18 in second region 70 in FIG. 5).

In one embodiment and through trenches 40, an etch-resistant material is formed laterally-aside the silicon nitride that is in the at least some first tiers 22y (e.g., those first tiers 22* containing silicon nitride 26). Example manners of doing so are described with reference to FIGS. 6-17.

Referring to FIGS. 6-9, carbon-doped silicon nitride 27 that is in its at least one lower first tier 22x has been laterally recessed (e.g., by etching) relative to sidewalls 33 of horizontally-elongated trenches 40. Silicon nitride 26 that is in its at least some first tiers 22y has been laterally recessed (e.g., by etching) relative to trench sidewalls 33 of horizontally-elongated trenches 40 to a greater degree than carbon-doped silicon nitride 27 that is in its at least one lower first tier 22x is so laterally recessed (if any recessing in tier[s] 22x occurs). As an example, and by way of example only, phosphoric acid will etch carbon-doped silicon nitride (having at least 2 atomic percent carbon) about ten times faster than silicon nitride that is devoid of carbon, and thus might be used to make a construction like that shown in FIGS. 6-9. In the example embodiment, such processing has not occurred with respect to second vertical stack 18 in second region 70 (e.g., there being no trench 40 sufficiently adjacent thereto).

FIGS. 10-13 show subsequent processing in one embodiment where etch-resistant material 35 has been formed laterally-aside silicon nitride 26 and carbon-doped silicon nitride 27 through trenches 40. Etch-resistant material 35 is etch resistant to an etching chemistry (e.g., phosphoric acid) to be used to etch carbon-doped silicon nitride 27 as described below. Any suitable material may be used. In one embodiment, etch-resistant material 35 is insulative (e.g., $AlO_x$, $HfO_x$, $ZrO_x$) and in another embodiment such is conductive (e.g., W, $WSi_x$, Ti, $TiSi_x$, Co, $CoSi_x$). In one ideal embodiment, etch-resistant material 35 is carbon. In the example embodiment, such processing has not occurred with respect to materials 26 and 27 in second vertical stack 18 in second region 70.

FIGS. 14-17 show subsequent example processing where etch-resistant material 35 that is laterally-aside carbon-doped silicon nitride 27 that is in the at least one lower first tier 22x has been removed (e.g., by etching). Some of carbon-doped silicon nitride 27 may also be removed during such removal (not shown) as may be some of etch-resistant material 35 in tiers 22y that is proximate silicon nitride 26 to be laterally recessed from trench walls 33 (as shown).

The processing referred to above is but one example of, through trenches 40, forming etch-resistant material 35 laterally-aside silicon nitride 26. Alternate processing may be used to achieve such, for example whereby no lateral recessing of either materials 26 or 27 occurs, lateral recessing only occurs relative to one of materials 26 and 27 and not the other, etch-resistant material 35 is not formed on material 27, etch-resistant material 35 is selectively formed on material 26, etc., as long as etch-resistant material 35 is formed laterally-aside silicon nitride 26 in such embodiments where such is so-formed (not required in all embodiments).

Referring to FIGS. 18-21, carbon-doped silicon nitride 27 (not shown) of the at least one lower first tier 22x has been etched selectively relative to etch-resistant material 35 through trenches 40 (e.g., using phosphoric acid or hydrogen fluoride-containing solutions). Ideally, such selective etching is conducted at a highly-selective removal rate of material 27 relative to etch-resistant material 35 of at least 10:1 by volume (e.g., as will occur using phosphoric acid where material 27 is carbon-doped silicon nitride having at least 2 atomic percent carbon and etch-resistant material 35 is carbon) such that at least some of (all as shown) etch-resistant material 35 remains at this point of processing. Nevertheless, some or all of etch-resistant material 35 may also be removed (e.g., if continuing etching even if using etching chemistry and conditions having a removal rate of at least 10:1). In the example embodiment, such processing has not occurred with respect to second vertical stack 18 in second region 70 (e.g., there being no trench 40 sufficiently adjacent thereto).

Referring to FIGS. 22-25, conducting material 48 (e.g., metal material) is formed in the at least one lower first tier 22x through trenches 40 after the etching as shown in FIGS. 18-21, with conducting material 48 thereafter having been removed from trenches 40. In the example embodiment, such processing has not occurred with respect to second vertical stack 18 in second region 70.

Referring to FIGS. 26-29, remaining, if any, of etch-resistant material 35 (not shown) that is in the at least some first tiers 22y has been removed (e.g., by etching) after forming conducting material 48 in the at least one lower first tier 22x. Thereafter, silicon nitride 26 (not shown) of the at least some first tiers 22y has been removed (e.g., by etching with phosphoric acid) through trenches 40. By way of example only, another etch-resistant material 61 may previously have been formed aside conducting material 48 if silicon nitride 26 is removed by etching that would also readily etch conducting material 48. Etch-resistant material 61 may be of the same or different composition as that of etch-resistant material 35. In one embodiment, etch-resistant material 61 comprises a metal silicide that is formed by thermal reaction of a metal of conducting material 48 with deposited silicon (not shown; e.g., by a salicide reaction), with such silicon being removed thereafter. Regardless, in the example embodiment, such processing has not occurred with respect to second vertical stack 18 in second region 70.

Referring to FIGS. 30-35, conductive material 63 has been formed in conductive tiers 22y (e.g., whereby silicon nitride 26 of the at least some first tiers 22y has been replaced with conductive material 63), then conductive material 63 has been removed from trenches 40, and then intervening material 57 has been formed in trenches 40. Conductive material 63 may be of the same or different composition from that of conducting material 48. In the example embodiment, such processing has not occurred with respect to second vertical stack 18 in second region 70.

Conductive material 63 and conducting material 48 comprise individual conductive lines 29 (e.g., wordlines) and construction 10 now comprises elevationally-extending strings 49 of individual transistors and/or memory cells 56. A thin insulative liner (e.g., $Al_2O_3$ and not shown) may be formed in conductive tiers 22* before forming each/either of conducting material 48 and conductive material 63. Approximate locations of some transistors and/or some memory cells 56 are indicated with a bracket or with dashed outlines, with transistors and/or memory cells 56 being essentially ring-like or annular in the depicted example. Alternately, transistors and/or memory cells 56 may not be completely encircling relative to individual channel openings 25 such that each channel opening 25 may have two or more elevationally-extending strings 49 (e.g., multiple transistors and/or memory cells about individual channel openings in individual conductive tiers with perhaps multiple wordlines per channel opening in individual conductive tiers, and not shown). Conducting material 48 and conductive material 63 may be considered as having terminal ends 50 corresponding to control-gate regions 52 of individual transistors and/or memory cells 56. Control-gate regions 52 in the depicted embodiment comprise individual portions of individual conductive lines 29. Materials 30, 32, and 34 may be considered as a memory structure 65 that is laterally between control-gate region 52 and channel material 36. In one embodiment and as shown with respect to the example "gate-last" processing, conducting material 48 and conductive material 63 of conductive tiers 22* are formed after forming openings 25. Alternately, the conducting material of the conductive tiers may be formed before forming channel openings 25.

A charge-blocking region (e.g., charge-blocking material 30) is between storage material 32 and individual control-gate regions 52. A charge block may have the following functions in a memory cell: In a program mode, the charge block may prevent charge carriers from passing out of the storage material (e.g., floating-gate material, charge-trapping material, etc.) toward the control gate, and in an erase mode the charge block may prevent charge carriers from flowing into the storage material from the control gate. Accordingly, a charge block may function to block charge migration between the control-gate region and the storage material of individual memory cells. An example charge-blocking region as shown comprises insulator material 30. By way of further examples, a charge-blocking region may comprise a laterally (e.g., radially) outer portion of the storage material (e.g., material 32) where such storage material is insulative (e.g., in the absence of any different-composition material between an insulative storage material 32 and conducting material 48/conductive material 63). Regardless, as an additional example, an interface of a storage material and conductive material of a control gate may be sufficient to function as a charge-blocking region in the absence of any separate-composition-insulator material 30. Further, an interface of conducting material 48/conductive material 63 with material 30 (when present) in combination with insulator material 30 may together function as a charge-blocking region, and as alternately or additionally may a laterally-outer region of an insulative storage material (e.g., a silicon nitride material 32). An example material 30 is one or more of silicon hafnium oxide and silicon dioxide.

Intervening material 57 in trenches 40 may provide lateral electrical isolation (insulation) between immediately-laterally-adjacent memory blocks 58. Such may include one or more of insulative, semiconductive, and conducting materials and, regardless, may facilitate conductive tiers 22* from shorting relative one another in a finished circuitry construction. Example insulative materials are one or more of $SiO_2$, $Si_3N_4$, and $Al_2O_3$. Intervening material 57 may include through array vias (not shown).

In one embodiment, a method used in forming a memory array (e.g., 12) comprising strings (e.g., 49) of memory cells (e.g., 56) comprises forming a vertical stack (e.g., 18) comprising alternating first and second tiers (e.g., 22*, 20, respectively) directly above a conductor tier (e.g., 16). Material of the first tiers (e.g., 26 and 27) is of different composition from material of the second tiers (e.g., 24). The first tiers and the second tiers comprise memory-block regions (e.g., 58) having a horizontally-elongated trench (e.g., 40) laterally-between immediately-laterally-adjacent of the memory-block regions. The first tiers comprise silicon nitride (e.g., 26, 27). At least one of a lower of the first tiers (e.g., 22*x*) comprises carbon-doped silicon nitride (e.g., 27) having at least 0.5 atomic percent more carbon than atomic percent of carbon, if any, in the silicon nitride (e.g., 26) of at least some of the first tiers (e.g., 22*y*) that are directly above the at least one lower first tier. Through the trenches, one of (a) and (b) is replaced with conducting material (e.g., 48), where:
 (a): carbon-doped silicon nitride 27 of the at least one lower first tier 22*x*, or
 (b): silicon nitride 26 of the at least some other tiers 22*y*;
Through the trenches, the other of the (a) and the (b) is replaced with conductive material (e.g., 63) after the replacing of the one. Channel-material strings (e.g., 53) are formed through the first tiers and the second tiers. The channel material (e.g., 36) of the channel-material strings is directly electrically coupled with conductor material (e.g., 17) of the conductor tier. In one embodiment, the one of the (a) and the (b) is the (a) and the other is the (b). In another embodiment, the one of the (a) and the (b) is the (b) and the other is the (a). Any other attribute(s) or aspect(s) as shown and/or described herein with respect to other embodiments may be used.

In the prior art where sacrificial silicon nitride in the conductive/first tiers is replaced with conducting material (e.g., 48), such can lead to tier collapse in one or more bottom tiers near trenches 40 where distance from an immediately-adjacent channel-material string can be greater than between immediately-adjacent channel-material strings. Using different carbon-composition silicon nitrides as described herein along with other aspects described herein may mitigate tier collapse risk.

Alternate embodiment constructions may result from method embodiments described above, or otherwise. Regardless, embodiments of the invention encompass memory arrays independent of method of manufacture. Nevertheless, such memory arrays may have any of the attributes as described herein in method embodiments. Likewise, the above-described method embodiments may incorporate, form, and/or have any of the attributes described with respect to device embodiments.

In one embodiment, a memory array (e.g., 12) comprising strings (e.g., 49) of memory cells (e.g., 56) comprises laterally-spaced memory blocks (e.g., 58) individually comprising a first vertical stack (e.g., 18 in FIG. 31) comprising vertically-alternating insulative tiers (e.g., 20) and conductive tiers (e.g., 22*). The strings of memory cells comprise channel-material strings (e.g., 53) that extend through the insulative tiers and the conductive tiers. A second vertical stack (e.g., 70 in FIG. 35) is aside the first vertical stack. The second vertical stack comprises insulative tiers (e.g., 20 and 22*) collectively comprising at least two different compositions (e.g., 24, 26, and 27) relative individual of the insulative tiers. Individual of the at least two different compositions comprise silicon nitride (e.g., 26, 27). One of the individual different compositions comprises carbon-doped silicon nitride (e.g., 27) having at least 0.5 atomic percent more carbon than atomic percent of carbon, if any, in the silicon nitride (e.g., 26) of another of the individual different compositions. Any other attribute(s) or aspect(s) as shown and/or described herein with respect to other embodiments may be used.

The above processing(s) or construction(s) may be considered as being relative to an array of components formed as or within a single stack or single deck of such components above or as part of an underlying base substrate (albeit, the single stack/deck may have multiple tiers). Control and/or other peripheral circuitry for operating or accessing such components within an array may also be formed anywhere as part of the finished construction, and in some embodiments may be under the array (e.g., CMOS under-array). Regardless, one or more additional such stack(s)/deck(s) may be provided or fabricated above and/or below that shown in the figures or described above. Further, the array(s) of components may be the same or different relative one another in different stacks/decks and different stacks/decks may be of the same thickness or of different thicknesses relative one another. Intervening structure may be provided between immediately-vertically-adjacent stacks/decks (e.g., additional circuitry and/or dielectric layers). Also, different stacks/decks may be electrically coupled relative one another. The multiple stacks/decks may be fabricated separately and sequentially (e.g., one atop another), or two or more stacks/decks may be fabricated at essentially the same time.

The assemblies and structures discussed above may be used in integrated circuits/circuitry and may be incorporated into electronic systems. Such electronic systems may be used in, for example, memory modules, device drivers, power modules, communication modems, processor modules, and application-specific modules, and may include multilayer, multichip modules. The electronic systems may be any of a broad range of systems, such as, for example, cameras, wireless devices, displays, chip sets, set top boxes, games, lighting, vehicles, clocks, televisions, cell phones, personal computers, automobiles, industrial control systems, aircraft, etc.

In this document unless otherwise indicated, "elevational", "higher", "upper", "lower", "top", "atop", "bottom", "above", "below", "under", "beneath", "up", and "down" are generally with reference to the vertical direction. "Horizontal" refers to a general direction (i.e., within 10 degrees) along a primary substrate surface and may be relative to which the substrate is processed during fabrication, and vertical is a direction generally orthogonal thereto. Reference to "exactly horizontal" is the direction along the primary substrate surface (i.e., no degrees there-from) and may be relative to which the substrate is processed during fabrication. Further, "vertical" and "horizontal" as used herein are generally perpendicular directions relative one another and independent of orientation of the substrate in three-dimensional space. Additionally, "elevationally-extending" and "extend(ing) elevationally" refer to a direction that is angled away by at least 45° from exactly horizontal. Further, "extend(ing) elevationally", "elevationally-extending", "extend(ing) horizontally", "horizontally-extending" and the like with respect to a field effect transistor are with reference to orientation of the transistor's channel length along which current flows in operation between the source/drain regions. For bipolar junction transistors, "extend(ing) elevationally" "elevationally-extending", "extend(ing) horizontally", "horizontally-extending" and the like, are with reference to orientation of the base length along which current flows in operation between the emitter and collector. In some embodiments, any component, feature, and/or region that extends elevationally extends vertically or within 10° of vertical.

Further, "directly above", "directly below", and "directly under" require at least some lateral overlap (i.e., horizontally) of two stated regions/materials/components relative one another. Also, use of "above" not preceded by "directly"

only requires that some portion of the stated region/material/component that is above the other be elevationally outward of the other (i.e., independent of whether there is any lateral overlap of the two stated regions/materials/components). Analogously, use of "below" and "under" not preceded by "directly" only requires that some portion of the stated region/material/component that is below/under the other be elevationally inward of the other (i.e., independent of whether there is any lateral overlap of the two stated regions/materials/components).

Any of the materials, regions, and structures described herein may be homogenous or non-homogenous, and regardless may be continuous or discontinuous over any material which such overlie. Where one or more example composition(s) is/are provided for any material, that material may comprise, consist essentially of, or consist of such one or more composition(s). Further, unless otherwise stated, each material may be formed using any suitable existing or future-developed technique, with atomic layer deposition, chemical vapor deposition, physical vapor deposition, epitaxial growth, diffusion doping, and ion implanting being examples.

Additionally, "thickness" by itself (no preceding directional adjective) is defined as the mean straight-line distance through a given material or region perpendicularly from a closest surface of an immediately-adjacent material of different composition or of an immediately-adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region(s), or structure(s) result(s) in no physical touching contact of the stated materials, regions, or structures relative one another.

Herein, regions-materials-components are "electrically coupled" relative one another if in normal operation electric current is capable of continuously flowing from one to the other and does so predominately by movement of subatomic positive and/or negative charges when such are sufficiently generated. Another electronic component may be between and electrically coupled to the regions-materials-components. In contrast, when regions-materials-components are referred to as being "directly electrically coupled", no intervening electronic component (e.g., no diode, transistor, resistor, transducer, switch, fuse, etc.) is between the directly electrically coupled regions-materials-components.

Any use of "row" and "column" in this document is for convenience in distinguishing one series or orientation of features from another series or orientation of features and along which components have been or may be formed. "Row" and "column" are used synonymously with respect to any series of regions, components, and/or features independent of function. Regardless, the rows may be straight and/or curved and/or parallel and/or not parallel relative one another, as may be the columns. Further, the rows and columns may intersect relative one another at 90° or at one or more other angles (i.e., other than the straight angle).

The composition of any of the conductive/conductor/conducting materials herein may be conductive metal material and/or conductively-doped semiconductive/semiconductor/semiconducting material. "Metal material" is any one or combination of an elemental metal, any mixture or alloy of two or more elemental metals, and any one or more metallic compound(s).

Herein, any use of "selective" as to etch, etching, removing, removal, depositing, forming, and/or formation is such an act of one stated material relative to another stated material(s) so acted upon at a rate of at least 2:1 by volume. Further, any use of selectively depositing, selectively growing, or selectively forming is depositing, growing, or forming one material relative to another stated material or materials at a rate of at least 2:1 by volume for at least the first 75 Angstroms of depositing, growing, or forming.

Unless otherwise indicated, use of "or" herein encompasses either and both.

CONCLUSION

In some embodiments, a method used in forming a memory array comprising strings of memory cells comprises forming a vertical stack comprising alternating first and second tiers directly above a conductor tier. Material of the first tiers is of different composition from material of the second tiers. The first tiers and the second tiers comprise memory-block regions having a horizontally-elongated trench laterally-between immediately-laterally-adjacent of the memory-block regions. The first tiers comprise silicon nitride. At least one of a lower of the first tiers comprises carbon-doped silicon nitride having at least 0.5 atomic percent more carbon than atomic percent of carbon, if any, in the silicon nitride of at least some of the first tiers that are directly above the at least one lower first tier. Through the trenches, one of (a) and (b) is replaced with conducting material, where: (a): the carbon-doped silicon nitride of the at least one lower first tier, or (b): the silicon nitride of the at least some other tiers. Through the trenches, the other of the (a) and the (b) is replaced with conductive material after the replacing of the one. Channel-material strings are formed through the first tiers and the second tiers. The channel-material of the channel-material strings is directly electrically coupled with conductor material of the conductor tier.

In some embodiments, a method used in forming a memory array comprising strings of memory cells comprises forming a vertical stack comprising alternating first and second tiers directly above a conductor tier. Material of the first tiers is of different composition from material of the second tiers. The first tiers and the second tiers comprise memory-block regions having a horizontally-elongated trench laterally-between immediately-laterally-adjacent of the memory-block regions. The first tiers comprise silicon nitride. At least one of a lower of the first tiers comprise carbon-doped silicon nitride having at least 0.5 atomic percent more carbon than atomic percent of carbon, if any, in the silicon nitride of at least some of the first tiers that are directly above the at least one lower first tier. Through the trenches, an etch-resistant material is formed laterally-aside the silicon nitride that is in the at least some first tiers. Through the trenches, the carbon-doped silicon nitride of the at least one lower first tier is etched selectively relative to the etch-resistant material. Through the trenches, conducting material is formed in the at least one lower first tier after the etching. Through the trenches, the remaining, if any, of the etch-resistant material that is in the at least some first tiers is removed after forming the conducting material in the at least one lower first tier. Through the trenches, the silicon nitride of the at least some first tiers is replaced with conductive material after the removing. Channel-material strings are formed through the first tiers and the second tiers. The channel-material of the channel-material strings is directly electrically coupled with conductor material of the conductor tier.

In some embodiments, a memory array comprising strings of memory cells comprises laterally-spaced memory blocks individually comprising a first vertical stack comprising vertically-alternating insulative tiers and conductive tiers. Strings of memory cells comprise channel-material strings that extend through the insulative tiers and the conductive tiers. A second vertical stack is aside the first vertical stack. The second vertical stack comprises insulative tiers collectively comprising at least two different compositions relative individual of the insulative tiers. Individual of the at least two different compositions comprise silicon nitride. One of the individual different compositions comprise carbon-doped silicon nitride having at least 0.5 atomic percent more carbon than atomic percent of carbon, if any, in the silicon nitride of another of the individual different compositions.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method used in forming a memory array comprising strings of memory cells, comprising:
    forming a vertical stack comprising alternating first and second tiers directly above a conductor tier, material of the first tiers being of different composition from material of the second tiers, the first tiers and the second tiers comprise memory-block regions having a horizontally-elongated trench laterally-between immediately-laterally-adjacent of the memory-block regions;
    the first tiers comprising silicon nitride, at least one of a lower of the first tiers comprising carbon-doped silicon nitride having at least 0.5 atomic percent more carbon than atomic percent of carbon, if any, in the silicon nitride of at least some of the first tiers that are directly above the at least one lower first tier;
    through the trenches, replacing one of (a) and (b) with conducting material, where:
        (a): the carbon-doped silicon nitride of the at least one lower first tier, or
        (b): the silicon nitride of the at least some of the first tiers that are directly above the at least one lower first tier;
    through the trenches, replacing the other of the (a) and the (b) with conductive material after the replacing of the one; and
    forming channel-material strings through the first tiers and the second tiers, the channel-material of the channel-material strings being directly electrically coupled with conductor material of the conductor tier.

2. The method of claim 1 wherein the one of the (a) and the (b) is the (a) and the other is the (b).

3. The method of claim 1 wherein the one of the (a) and the (b) is the (b) and the other is the (a).

4. The method of claim 1 wherein the conducting and conductive materials are of the same composition relative one another.

5. The method of claim 1 wherein one of the at least one is the lowest first tier in the alternating first and second tiers that are directly above the conductor tier.

6. The method of claim 1 wherein one of the at least one is the second-lowest first tier in the alternating first and second tiers that are directly above the conductor tier.

7. The method of claim 1 wherein the second tiers at least predominantly comprise silicon dioxide.

8. The method of claim 1 wherein the second tiers are at least predominantly devoid of silicon nitride.

9. A method used in forming a memory array comprising strings of memory cells, comprising:
    forming a vertical stack comprising alternating first and second tiers directly above a conductor tier, material of the first tiers being of different composition from material of the second tiers, the first tiers and the second tiers comprise memory-block regions having a horizontally-elongated trench laterally-between immediately-laterally-adjacent of the memory-block regions;
    the first tiers comprising silicon nitride, at least one of a lower of the first tiers comprising carbon-doped silicon nitride having at least 0.5 atomic percent more carbon than atomic percent of carbon, if any, in the silicon nitride of at least some of the first tiers that are directly above the at least one lower first tier;
    through the trenches, forming an etch-resistant material laterally-aside the silicon nitride that is in the at least some first tiers;
    through the trenches, etching the carbon-doped silicon nitride of the at least one lower first tier selectively relative to the etch-resistant material;
    through the trenches, forming conducting material in the at least one lower first tier after the etching;
    through the trenches, removing remaining, if any, of the etch-resistant material that is in the at least some first tiers after forming the conducting material in the at least one lower first tier;
    through the trenches, replacing the silicon nitride of the at least some first tiers with conductive material after the removing; and
    forming channel-material strings through the first tiers and the second tiers, the channel-material of the channel-material strings being directly electrically coupled with conductor material of the conductor tier.

10. The method of claim 9 wherein the carbon-doped silicon nitride in the at least one lower first tier has at least 1.0 atomic percent more carbon than atomic percent of carbon, if any, in the silicon nitride of the at least some first tiers.

11. The method of claim 10 wherein the carbon-doped silicon nitride in the at least one lower first tier has at least 2.0 atomic percent more carbon than atomic percent of carbon, if any, in the silicon nitride of the at least some first tiers.

12. The method of claim 11 wherein the carbon-doped silicon nitride in the at least one lower first tier has at least 5.0 atomic percent more carbon than atomic percent of carbon, if any, in the silicon nitride of the at least some first tiers.

13. The method of claim 12 wherein the carbon-doped silicon nitride in the at least one lower first tier has at least 9.0 atomic percent more carbon than atomic percent of carbon, if any, in the silicon nitride of the at least some first tiers.

14. The method of claim 9 wherein the carbon-doped silicon nitride in the at least one lower first tier has at least 2.0 atomic percent carbon.

15. The method of claim 9 wherein the silicon nitride in the at least some tiers is devoid of carbon.

16. The method of claim 9 wherein the at least one is more than one.

17. The method of claim 16 wherein the more than one are of the same carbon content relative one another.

18. The method of claim 16 wherein the more than one are of at least two different carbon contents relative one another.

19. The method of claim 18 wherein the more than one are of more than two different carbon contents relative one another.

20. The method of claim 9 wherein the at least one is only one.

21. The method of claim 9 wherein one of the at least one is the lowest first tier in the alternating first and second tiers that are directly above the conductor tier.

22. The method of claim 9 wherein one of the at least one is the second lowest first tier in the alternating first and second tiers that are directly above the conductor tier.

23. The method of claim 9 wherein the etch-resistant material is carbon.

24. The method of claim 9 wherein the etch-resistant material is insulative.

25. The method of claim 9 wherein the etch-resistant material is conductive.

26. The method of claim 9 comprising laterally recessing the silicon nitride that is in the at least some first tiers relative to sidewalls of the horizontally-elongated trenches prior to forming the etch-resistant material.

27. The method of claim 9 comprising removing some and only some of the etch resistant material that is laterally-aside the silicon nitride that is in the at least some first tiers prior to the etching using an etching chemistry that is different from an etching chemistry that is used during the etching.

28. The method of claim 9 wherein the material of individual of the second tiers at least predominantly comprises silicon dioxide.

29. The method of claim 9 wherein the material of individual of the second tiers is at least predominantly devoid of silicon nitride.

30. The method of claim 9 comprising:
laterally recessing the silicon nitride that is in the at least one first tier relative to sidewalls of the horizontally-elongated trenches prior to forming the etch-resistant material;
laterally recessing the silicon nitride that is in the at least some first tiers relative to the sidewalls of the horizontally-elongated trenches prior to forming the etch-resistant material and to a greater degree than the silicon nitride that is in the at least one first tier is so laterally recessed;
through the trenches, forming the etch-resistant material laterally-aside the silicon nitride that is in the at least one first tier; and
removing the etch-resistant material that is laterally-aside the silicon nitride that is in the at least one first tier prior to the etching.

\* \* \* \* \*